United States Patent [19]

Nakaniwa

[11] Patent Number: 5,105,657
[45] Date of Patent: Apr. 21, 1992

[54] METHOD AND APPARATUS FOR DETECTING MISFIRED CYLINDER OF INTERNAL COMBUSTION ENGINE

[75] Inventor: Shinpei Nakaniwa, Isesaki, Japan

[73] Assignee: Japan Electronic Control Systems Co., Ltd., Isesaki, Japan

[21] Appl. No.: 637,683

[22] Filed: Jan. 7, 1991

[30] Foreign Application Priority Data

| Jan. 9, 1990  | [JP] | Japan | 2-984   |
|---------------|------|-------|---------|
| Jan. 17, 1990 | [JP] | Japan | 2-6363  |
| Jan. 18, 1990 | [JP] | Japan | 2-7055  |
| Jan. 31, 1990 | [JP] | Japan | 2-18873 |

[51] Int. Cl.$^5$ .......................................... G01M 15/00
[52] U.S. Cl. .......................................... 73/117.3
[58] Field of Search .......................... 73/117.3, 116; 364/431.07

[56] References Cited

U.S. PATENT DOCUMENTS 4,492,108  1/1985  van Zanten .................. 73/116 X
4,995,365  2/1991  Denz et al. ............. 364/431.07 X

*Primary Examiner*—Jerry W. Myracle
*Attorney, Agent, or Firm*—Foley & Lardner

[57] ABSTRACT

A value approximately corresponding to the amount of a change in mean effective pressure calculated on the basis of the revolution period of an engine is used for discrimination of a misfire. In detecting a misfired cylinder by comparing this misfire discriminating value with a slice level, a misfire detection at the coasting time is avoided. Further, a misfire discriminating value corresponding to a misfired cylinder is specified on the basis of a predetermined varying pattern of the discriminating value. The slice level is set to the proper value in accordance with this discriminating value.

18 Claims, 24 Drawing Sheets

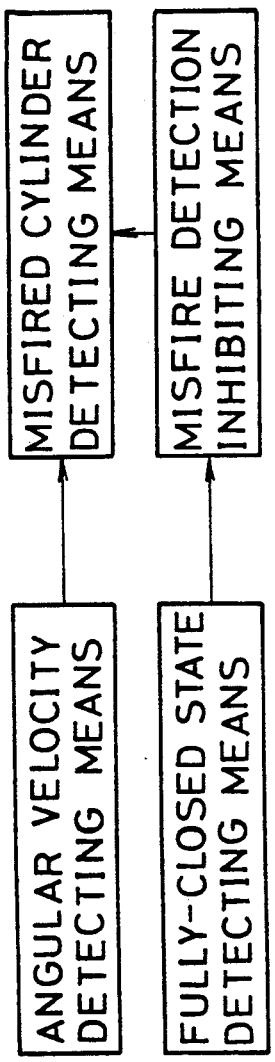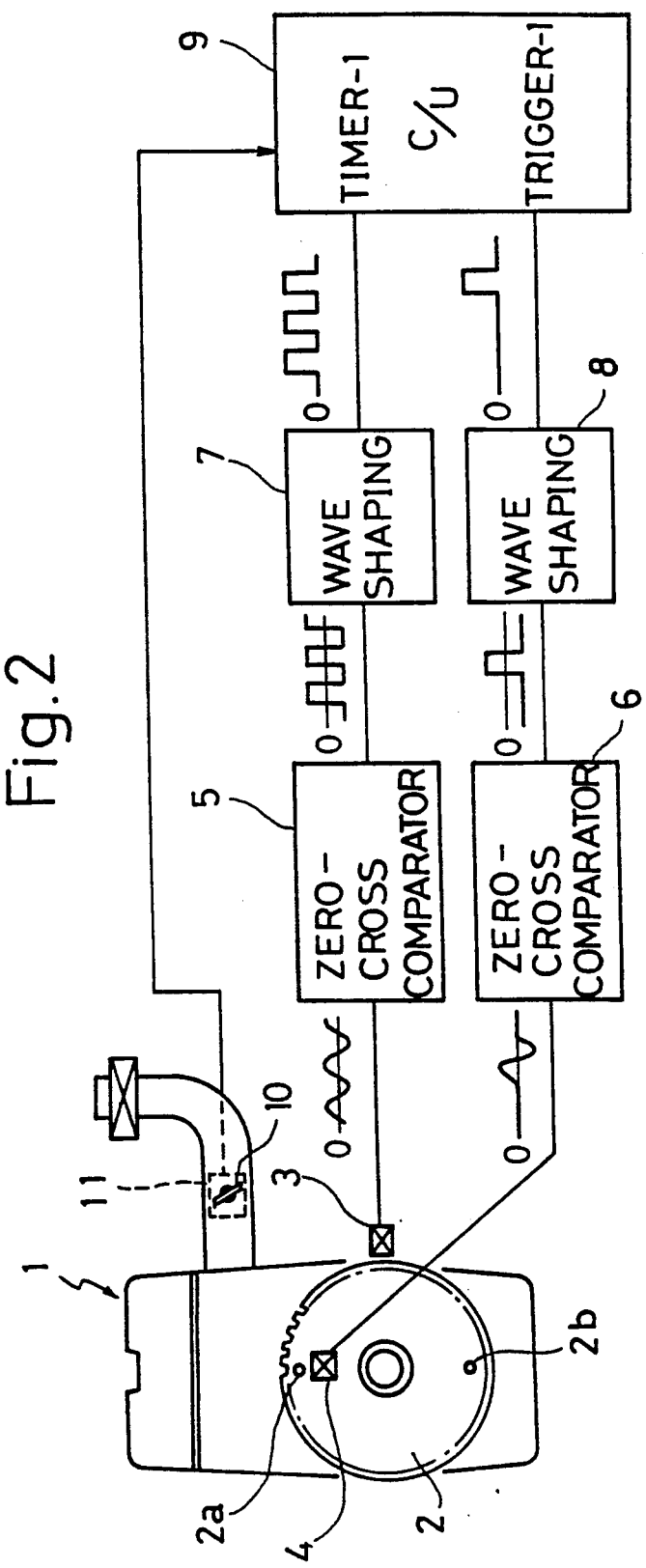

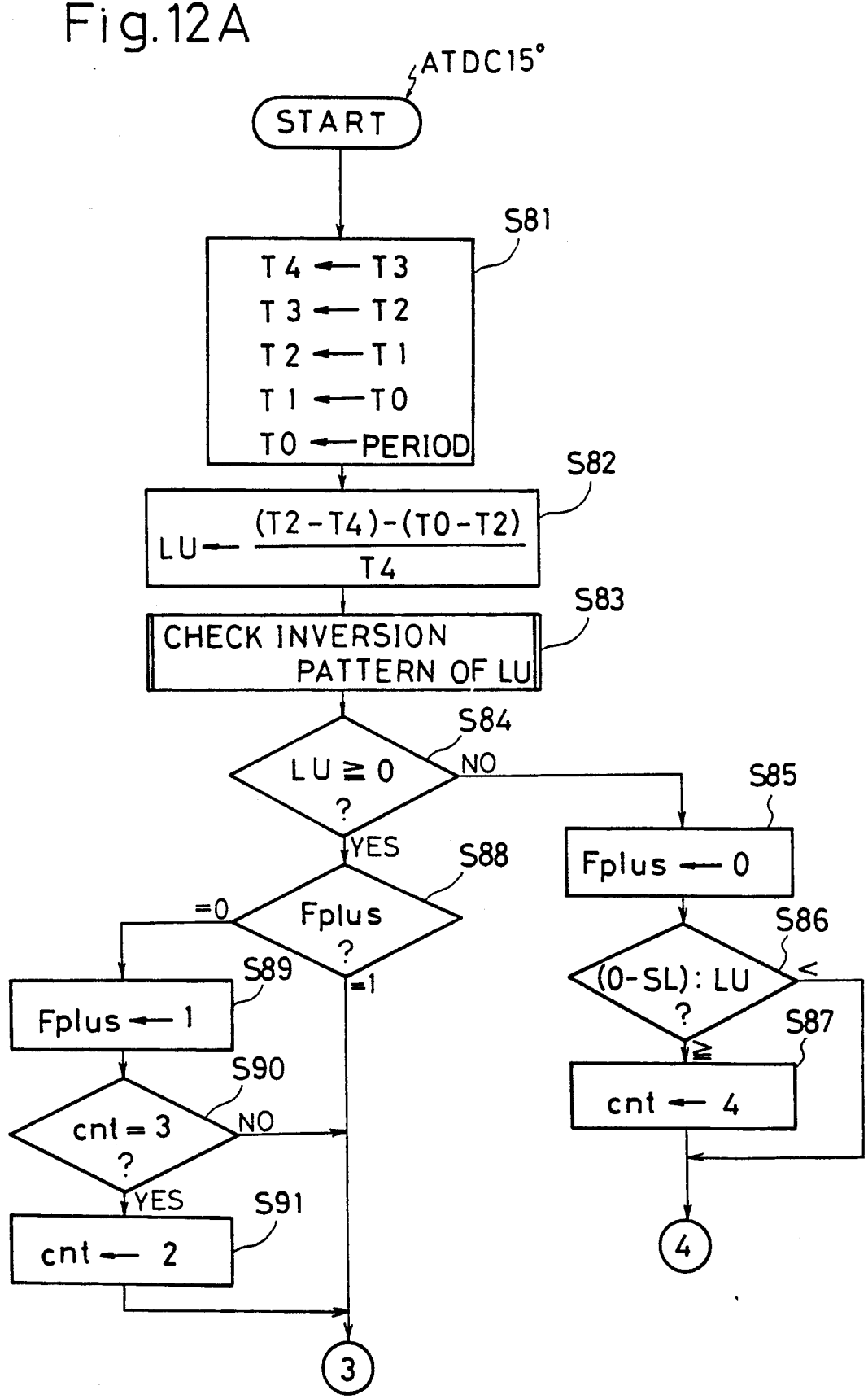

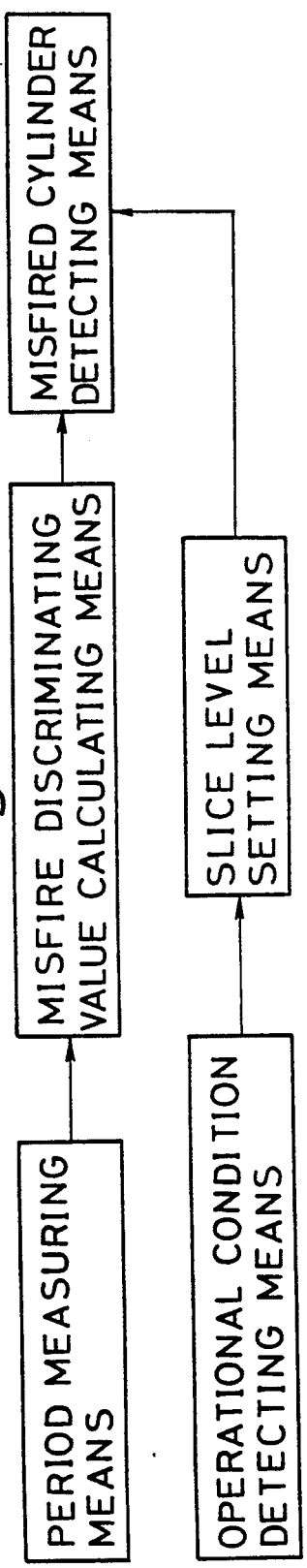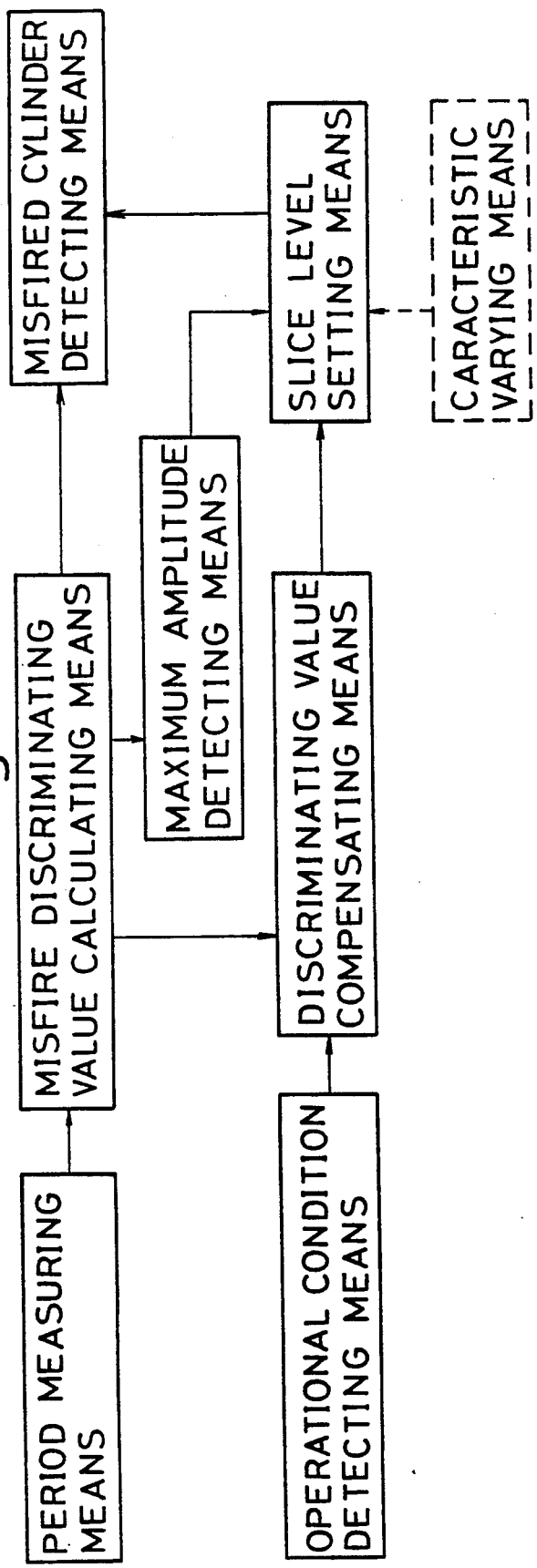
Fig. 18
Fig. 19

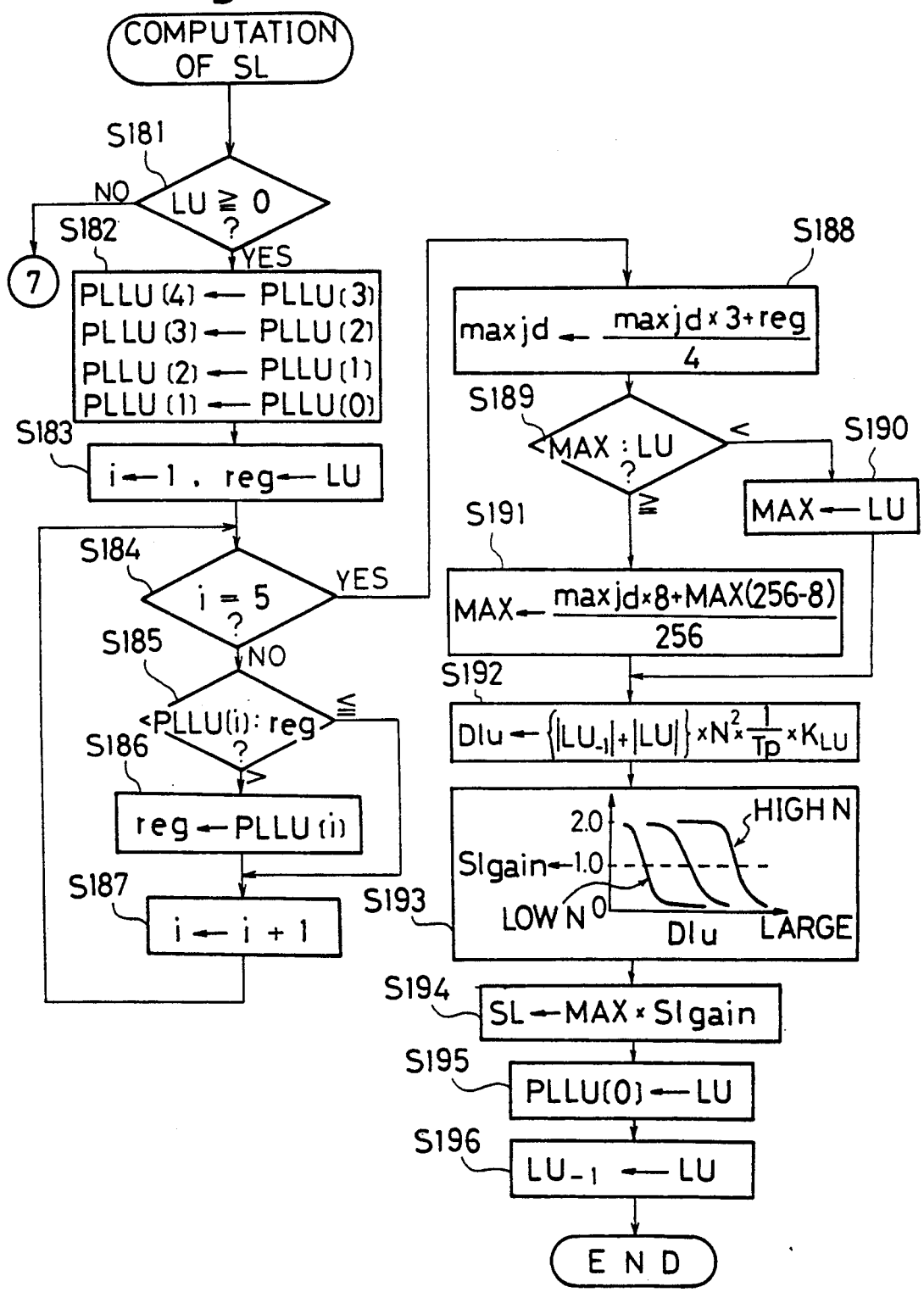

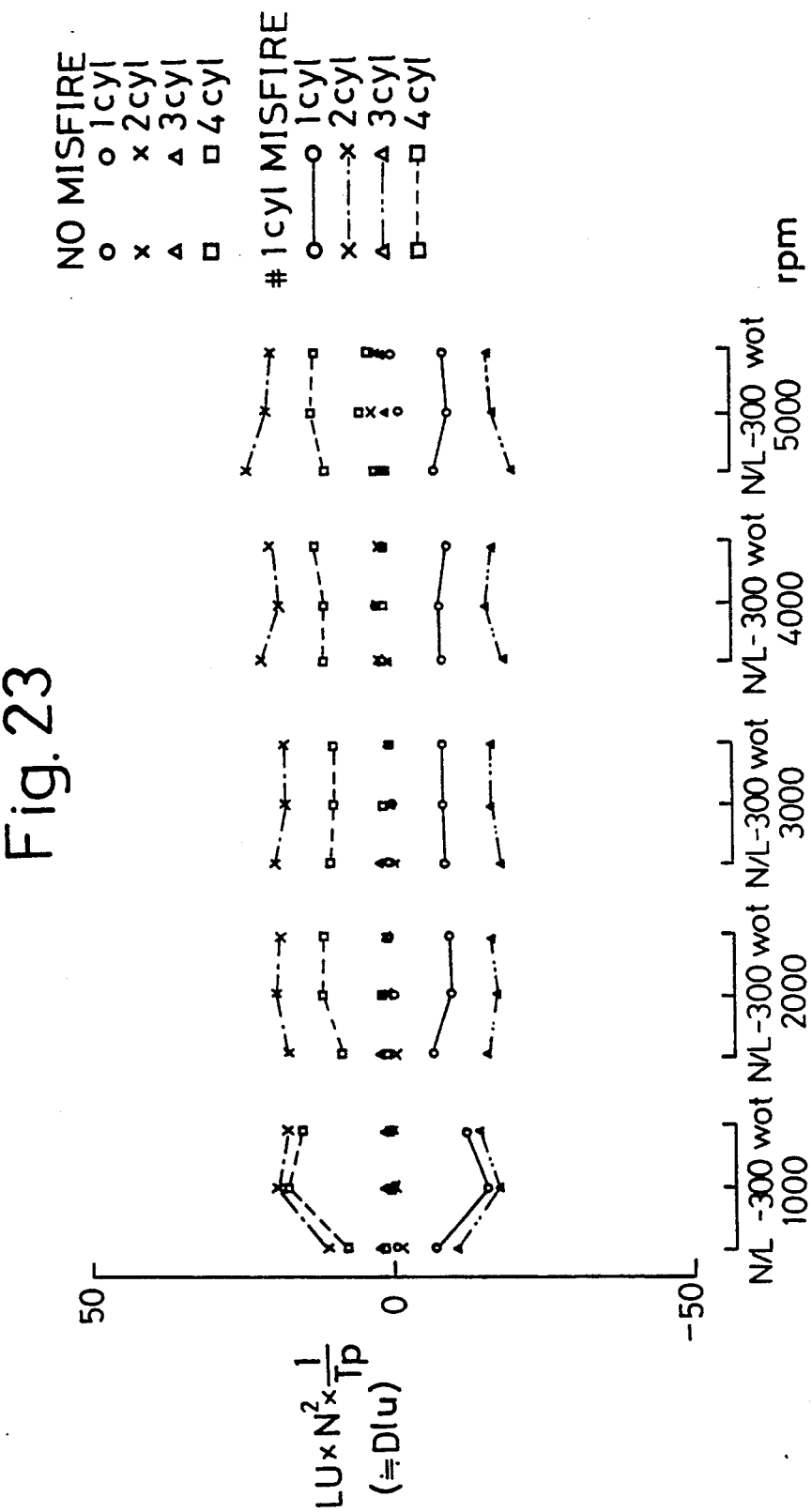

METHOD AND APPARATUS FOR DETECTING MISFIRED CYLINDER OF INTERNAL COMBUSTION ENGINE

BACKGROUND OF THE INVENTION

1. Field of the Invention

The present invention relates to a method and apparatus for detecting a misfired cylinder of an internal combustion engine. More particularly, this invention pertains to a method and apparatus for detecting a misfired cylinder based on a change in revolutions of an internal combustion engine.

2. Description of the Related Art

There is an apparatus for detecting a misfired cylinder of an internal combustion engine, which computes a misfire discriminating value approximately corresponding to the amount of a change in mean effective pressure based on the rotational period of the engine and discriminates a misfired cylinder on the basis of this discriminating value (refer to ISATA-Paper "Experiences with a new method for measuring the engine roughness" 1979, by R. Latsch, E. Mausner, V. Bianchi, and Japanese Patent Application No. 1-275046).

More specifically, upper top dead center (TDC) periods (180 degrees for a four-cylinder internal combustion engine), for example, are sequentially measured, and with "half" representing the TDC period of ½ cycle before, "old" representing the TDC period of one cycle before and "new" representing the latest TDC period, a value LU approximately corresponding to the amount of a change in mean effective pressure (amount of a change in mean effective pressure during the combustion stroke process) is calculated by substituting these TDC periods into the following equation.

$$LU = \frac{\text{(half-old)} - \text{(new-half)}}{\text{old}}$$

The value LU acquired from the above equation is compared with a slice level SL (minus value), which has been preset in accordance with operational conditions of the engine, such as an engine load and engine revolution speed. When LU falls below or equal to the slice level SL, it is assumed that the mean effective pressure has decreased due to a misfire, and that cylinder which was undergoing the combustion stroke process during the latest TDC period, "new," used in the computation of LU, is detected as a misfired cylinder. In other words, the cylinder in which the misfire has occurred is detected on the basis of a negative change in mean effective pressure, and the value LU is used for misfire discrimination, so that this LU will be considered hereunder as "a misfire discriminating value".

When consecutive misfire discriminating values LU are negative and when at least one of the values is equal to or lower than the slice level SL, the previous misfire discriminating value LU is considered to indicate the occurrence of a misfire.

In a coasting state of a vehicle, the level of the mean effective pressure significantly decreases on the whole, so that even the presence of a misfired cylinder may not clearly appear as a variation in engine revolution speed. In the coasting state, therefore, there is no difference between the discriminating values LU originating from the presence and absence of a misfired cylinder, therefore the detection of a misfired cylinder based on the misfire discriminating value LU may be impossible or very difficult.

Consequently, the previous warning of the presence of a misfired cylinder would be canceled, resulting in erroneous detection of a misfired cylinder as having the proper combustion. This deteriorates the reliability of detection of misfired cylinders.

According to the above detection of a misfired cylinder based on the misfire discriminating value LU, it is possible to detect a misfired cylinder with a high degree of precision when, for example, a single specific cylinder continuously misfires; however, there may occur an erroneous detection of a misfired cylinder when a misfire sometimes occurs in one cylinder.

When a single, noncontinuous misfire occurs as mentioned above, the rotation of the engine fluctuates after the occurrence of the misfire due to a misfire-originated reduction in mean effective pressure so that the misfire discriminating value LU computed with the rotational fluctuation reflecting thereon may greatly change to the negative side as in the case of a misfire occurring in a cylinder. Therefore, there is a possibility of detecting a unmisfired cylinder as a misfired cylinder after the occurrence of a single misfire.

Further, in a case where a misfire occurs in an unstable rotation state or a low-speed revolution state of the engine, such as during idling operation, a misfire discriminating value LU corresponding to a cylinder having normal combustion may greatly change to the negative side due to an irregular rotational change of the engine originating from the occurrence of a misfire even when a single specific cylinder is continuously misfiring. This will cause erroneous detection of the misfired cylinder.

With regard to the slice level SL which is to be compared with the misfire discriminating value LU as mentioned earlier, a slice level map having the proper values for individual operational conditions of the engine such as engine load and engine revolution speed is prepared in advance in order to cope with a change in the misfire discriminating value LU due to the conditions. Accordingly, the number for steps of finding the slice level SL matching the discriminating value increases, and a larger memory capacity is required for the slice levels SL.

SUMMARY OF THE INVENTION

It is therefore an object of the present invention to provide an arrangement for detecting a misfired cylinder based on a change in engine revolution to avoid an erroneous discrimination that no misfired cylinders exist when a coasting operation is performed with a misfired cylinder present, thereby improving the reliability of detecting misfired cylinders.

It is another object to prevent any cylinder having normal combustion from being erroneously detected as a misfired cylinder, even when a misfire noncontinuously occurs in a specific cylinder which causes a rotational fluctuation.

It is a further object to ensure accurate detection of a misfired cylinder even when a misfire occurs in an unstable rotational state of the engine, such as an idling state.

It is a still further object to enable calculation of a slice level for misfire discrimination in association with each operation condition of the engine to thereby reduce the number of steps for finding the slice levels matching the individual operation conditions in advance while decreasing the required memory capacity.

To achieve the above objects, according to the present invention, a method for detecting a misfired cylinder of an internal combustion engine based on crank angular velocity of an internal combustion engine inhibits detection of a misfired cylinder at least under the condition when a throttle valve disposed in an air suction system of the engine is fully closed.

In a coasting state of a vehicle, the presence/absence of a misfire does not clearly appear as a change in crank angular velocity, preventing discrimination of the presence/absence of the misfire. Therefore, a fully-closed state of a throttle valve is detected as a condition for the coasting state, and detection of a misfired cylinder is prohibited when the throttle valve is fully closed, thereby preventing erroneous detection of no misfired cylinder being present even when a misfired cylinder actually exists.

If only the fully-closed state of the throttle valve is taken as a condition to inhibit misfire detection, misfire detection will always be prohibited even in a normal idling state. It is therefore preferable that the fully-closed state of the throttle valve and a crank angular velocity being equal to or greater than a predetermined value be taken as conditions to inhibit detection of a misfired cylinder, thereby ensuring detection of a misfired cylinder in a normal idling state.

Further, in a method for detecting a misfired cylinder of an internal combustion engine by calculating a misfire discriminating value approximately corresponding to a change in mean effective pressure based on engine revolution speed and comparing the misfire discriminating value with a predetermined slice level, a positive/negative inversion pattern of the misfire discriminating value at a time of occurrence of a misfire is acquired in advance, and detection of a misfired cylinder is inhibited when an actual misfire discriminating value does not change along the positive/negative inversion pattern of the misfire discriminating value.

In other words, since a misfire discriminating value changes in a predetermined positive/negative inversion pattern at the time a misfire occurs, even if a misfire discriminating value exceeding a slice level is computed, detection of a misfired cylinder based on the calculated value is prohibited when the misfire discriminating value changes in another pattern. For instance, even when a single, noncontinuous misfire occurs, and rotation fluctuates after the occurrence of the misfire due to the influence thereof so that a misfire discriminating value exceeding the slice level is computed with the rotational fluctuation reflecting thereon, it is possible to avoid erroneous detection of the misfired cylinder.

When the positive/negative inversion pattern differs from the one acquired in advance and detection of a misfired cylinder should be inhibited, a misfire discriminating value exceeding the slice level can be compensated to come within the slice level by decreasing the absolute value of the misfire discriminating value, thus ensuring prohibition of the detection of the misfired cylinder.

In addition, if the number of actual misfire discriminating values which are to be compared with a positive/negative inversion pattern obtained in advance is variably set in accordance with the operational conditions of the engine, it is possible to execute a process of inhibiting a misfire detection according to the positive/negative inversion pattern of the misfire discriminating value only in a state where the rotational fluctuation occurring after a single, noncontinuous misfire continues. It is therefore possible to limit the period for prohibiting the misfire detection to thereby suppress reduction of the chance of detecting misfires.

Further, in a method of detecting a misfired cylinder of an internal combustion engine having an even number of cylinders, a misfire discriminating value approximately corresponding to the amount of a change in means effective pressure is calculated based on an engine revolution speed in association with each cylinder while a slice level for detection of a misfired cylinder according to the misfire discriminating value is set; and a cylinder corresponding to a misfire discriminating value of one engine turn before from a first inversion of a misfire discriminating value from negative to positive is detected as a misfired cylinder, when misfire discriminating values corresponding to half of the consecutive cylinders in an ignition order are negative, misfire discriminating values corresponding to a remaining second half of the cylinders are positive, at least one of the consecutive negative misfire discriminating values is equal to or less than a negative slice level, and at least one of the consecutive positive misfire discriminating values exceeds a positive slice level.

That is, when a rotational change of the engine such as idling is likely to occur, even in a state of a continuous misfire having occurred in one cylinder, a misfire may be erroneously detected on the basis of a misfire discriminating value corresponding to that cylinder which is not actually misfiring due to a rotational change caused by the misfire. However, since an engine with an even number of cylinders has such a characteristic that a misfire discriminating value changes in the positive direction for a first half of the consecutive cylinders in the ignition order at the misfire time and the discriminating value changes in the negative direction for the second half of the cylinders, a true misfire discriminating value associated with the occurrence of a misfire can be detected on the basis of this characteristic.

Also, a misfire detecting method according to the present invention calculates a misfire discriminating value approximately corresponding to an amount of change in mean effective pressure based on a period within a predetermined crank angle range of the engine and then detects a maximum amplitude of the misfire discriminating value. While the method compensates a misfire discriminating value in a direction to reduce a level difference between misfire discriminating values originating from an engine operational condition based on operational conditions of the engine including at least an engine revolution speed and an engine load; then sets a slice level within the maximum amplitude when an amplitude of the compensated misfire discriminating value is equal to or greater than a predetermined value, and the slice level outside the maximum amplitude is set when the amplitude of the compensated misfire discriminating value is less than the predetermined value, and the set slice level is compared with the misfire discriminating value to thereby detect a misfired cylinder.

With the above arrangement, the presence/absence of a misfire of the misfire discriminating value is approximately predicted by the amplitude of the misfire discriminating value which has been compensated in the direction to reduce the level difference caused by the operational conditions of the engine, and the slice level is set within or outside the maximum amplitude of the misfire discriminating value based on the result of the prediction.

In other words, since the level of the misfire discriminating value greatly varies with the engine revolution speed and engine load, if the misfire discriminating value is compensated in a direction to reduce the level difference caused by the operational conditions of the engine based on these parameters, misfire discriminating values of almost the same level should be acquired. When the amplitude of the compensated misfire discriminating value is equal to or greater than a predetermined value, it is presumed that the occurrence of a misfire has resulted in calculation of a misfire discriminating value whose amplitude is equal to or greater than is expected by the operational conditions of the engine. Based on the assumption, the slice level is set within the maximum amplitude of the misfire discriminating value upon occurrence of a misfire, thus permitting the misfire to be detected. When no misfire occurs, on the other hand, the slice level is set outside the maximum amplitude of the misfire discriminating value to thereby prevent detection of a misfire.

The above compensation for a misfire discriminating value is executed by multiplying the misfire discriminating value by a parameter of the engine revolution speed, then dividing a resultant value by a parameter of the engine load.

Further, in setting the slice level within or outside the maximum amplitude of a misfire discriminating value, a characteristic for setting the slice level is variably set in accordance with the engine revolution speed. This can increase the slice level setting accuracy and thus improve the misfire detection precision.

An apparatus for detecting a misfired cylinder of an internal combustion engine according to the present invention comprises an angular velocity detecting means for detecting a crank angular velocity of the engine; a misfired cylinder detecting means for detecting a misfired cylinder based on the crank angular velocity; a fully-closed state detecting means for detecting a fully-closed state of a throttle valve disposed in an air suction system of the engine; and a misfire detection inhibiting means for inhibiting the misfired cylinder detecting means from detecting a misfired cylinder at least under a condition when the fully-closed state of the throttle valve has been detected.

With this arrangement, in the fully-closed state of the throttle valve including the coasting state of a vehicle, the misfired cylinder detecting means is inhibited from detecting a misfired cylinder based on the crank angular velocity, thus preventing erroneous detection at the coasting time which impairs the accuracy of detecting a misfired cylinder.

If the misfire detection inhibiting means is designed to inhibit the detection of a misfired cylinder when the fully-closed state of the throttle valve is detected and the crank angular velocity is equal to or greater than a predetermined level, the conditions for prohibiting the misfire detection can be further restricted to detect the misfired cylinder in a wider range.

Also, in an apparatus for detecting a misfired cylinder of an internal combustion engine, comprising a period measuring means for measuring a revolution period of the engine, a misfire discriminating value calculating means for calculating a misfire discriminating value approximately corresponding to an amount of a change in mean effective pressure based on the revolution period, and a misfired cylinder detecting means for detecting a misfired cylinder by comparing the calculated misfire discriminating value with a predetermined slice level, the improvement further comprises a misfire detection inhibiting means for inhibiting the misfired cylinder detecting means from detecting a misfired cylinder when an actual misfire discriminating value does not change along a preacquired positive/negative inversion pattern of the misfire discriminating value at a time of occurrence of a misfire.

Since a misfire discriminating value changes along a predetermined positive/negative inversion pattern at the time a misfire occurs, when the actual misfire discriminating value does not vary along this predetermined positive/negative inversion pattern, it is assumed that the change in discriminating value originates from the influence of a rotational fluctuation or the like. When the misfire discriminating value does not alter along the predetermined positive/negative inversion pattern, therefore, the misfired cylinder detecting means is inhibited from detecting a misfired cylinder, thereby preventing erroneous detection of a misfired cylinder upon occurrence of the rotational fluctuation.

Here, the misfire detection inhibiting means may be designed to inhibit the misfired cylinder detecting means from detecting a misfired cylinder by decreasing the absolute value of the misfire discriminating value.

Decreasing the absolute value of the misfire discriminating value can forcibly compensate the discriminating value to not exceed the slice level, so that detection of a misfired cylinder can be substantially prohibited while performing the normal comparison of the discriminating value with the slice level.

Further, it is preferable that there be a discriminating number variable setting means for variably setting the number of chances for discriminating misfire discriminating values whose positive/negative inversion pattern is discriminated by the misfire detection inhibiting means, in accordance with operational conditions of the engine.

The duration of a rotational fluctuation caused after a misfire differs depending on the operational conditions of the engine. The region where the detection of a misfired cylinder is inhibited on the basis of the positive/negative inversion pattern of misfire discriminating values can be limited to the necessary region by variably setting the number of chances for discriminating misfire discriminating values whose positive/negative inversion pattern is discriminated by the misfire detection inhibiting means, in accordance with the operational conditions of the engine.

Another apparatus for detecting a misfired cylinder of an internal combustion engine according to the present invention comprises a period measuring means for measuring a revolution period of an internal combustion engine having an even number of cylinders; a misfire discriminating value calculating means for calculating a misfire discriminating value approximately corresponding to an amount of a change in mean effective pressure based on the revolution period; an operational condition detecting means for detecting an engine operational condition; a slice level setting means for setting a slice level for detection of a misfired cylinder by the misfire discriminating value based on the engine operational condition; and a misfired cylinder detecting means for detecting a cylinder corresponding to a misfire discriminating value of one engine turn before from a first inversion of a misfire discriminating value from negative to positive, when misfire discriminating values corresponding to half of the consecutive cylinders in an ignition order are negative, misfire discriminating values corresponding to a remaining second half of the cylinders are positive, at least one of the consecutive negative misfire discriminating values is equal to or less than a negative slice level, and at least one of the consecutive positive misfire discriminating values exceeds a positive slice level.

The pattern of a change in the misfire discriminating value for an even number of cylinders at the time a misfire occurs shows a specific pattern as described above. If the change does not follow this pattern, even when a misfire discriminating value exceeding the slice level is computed, this discriminating value is considered as irrelevant to the true occurrence of a misfire and the misfire cylinder detecting means is inhibited from detecting a misfired cylinder.

A different apparatus for detecting a misfired cylinder according to the present invention comprises a period measuring means for measuring a period within a predetermined crank angle range of the engine; a misfire discriminating value calculating means for calculating a misfire discriminating value approximately corresponding to an amount of a change in mean effective pressure based on the measured period; a maximum amplitude detecting means for detecting a maximum amplitude of the misfire discriminating value; an operational condition detecting means for detecting operational conditions of the engine including at least an engine revolution speed and an engine load; a discriminating value compensating means for compensating the misfire discriminating value in a direction to reduce a level difference between misfire discriminating values originating from an engine operational condition based on the detected operational conditions of the engine; a slice level setting means for setting a slice level within the maximum amplitude detected by the maximum amplitude detecting means when an amplitude of the compensated misfire discriminating value is equal to or greater than a predetermined value, and setting the slice level outside the maximum amplitude when the amplitude of the compensated misfire discriminating value is less than the predetermined value; and a misfired cylinder detecting means for comparing the set slice level with the misfire discriminating value calculated by the misfire discriminating value calculating means to thereby detect a misfired cylinder.

With the above arrangement, when the amplitude of the misfire discriminating value compensated in the direction to reduce the level difference caused by the operational conditions of the engine is equal to or greater than a predetermined value, it is predicted that a misfire discriminating value having an amplitude equal to or greater than is expected under the operational conditions of the engine has been calculated because of the occurrence of a misfire. Based on this prediction, the slice level setting means sets the slice level within the maximum amplitude of the misfire discriminating value upon occurrence of a misfire to permit misfire detection, and sets the slice level outside this maximum amplitude when no misfires are caused, thus prohibiting misfire detection.

Here, the discriminating value compensating means compensates a misfire discriminating value in the direction to reduce the level difference between misfire discriminating values originating from an engine operational condition by multiplying the misfire discriminating value, calculated by the misfire discriminating value calculating means, by a parameter of the engine revolution speed, then dividing a resultant value by a parameter of the engine load.

Further, it is preferable that a characteristic varying means be provided to variably set a slice level setting characteristic in the slice level setting means in accordance with the engine revolution speed. The provision of the characteristic varying means can set the slice level more accurately in accordance with the level required by the engine revolution speed.

Other objects and advantages as well as variations of the present invention will be apparent from the following description of preferred embodiments of the invention in conjunction with the accompanying drawings.

BRIEF DESCRIPTION OF THE DRAWINGS

FIG. 1 is a block diagram illustrating individual components of the first embodiment of the present invention;

FIG. 2 is a schematic view of a system of the first embodiment;

FIG. 18 is a block diagram illustrating individual components of the third embodiment of the present invention;

FIG. 19 is a block diagram illustrating individual components of the fourth embodiment;

FIG. 23 is a graphical view for explaining the effect of compensating a misfire discriminating value LU according to the fourth embodiment.

DETAILED DESCRIPTION OF THE PREFERRED EMBODIMENTS

Figure 3A:
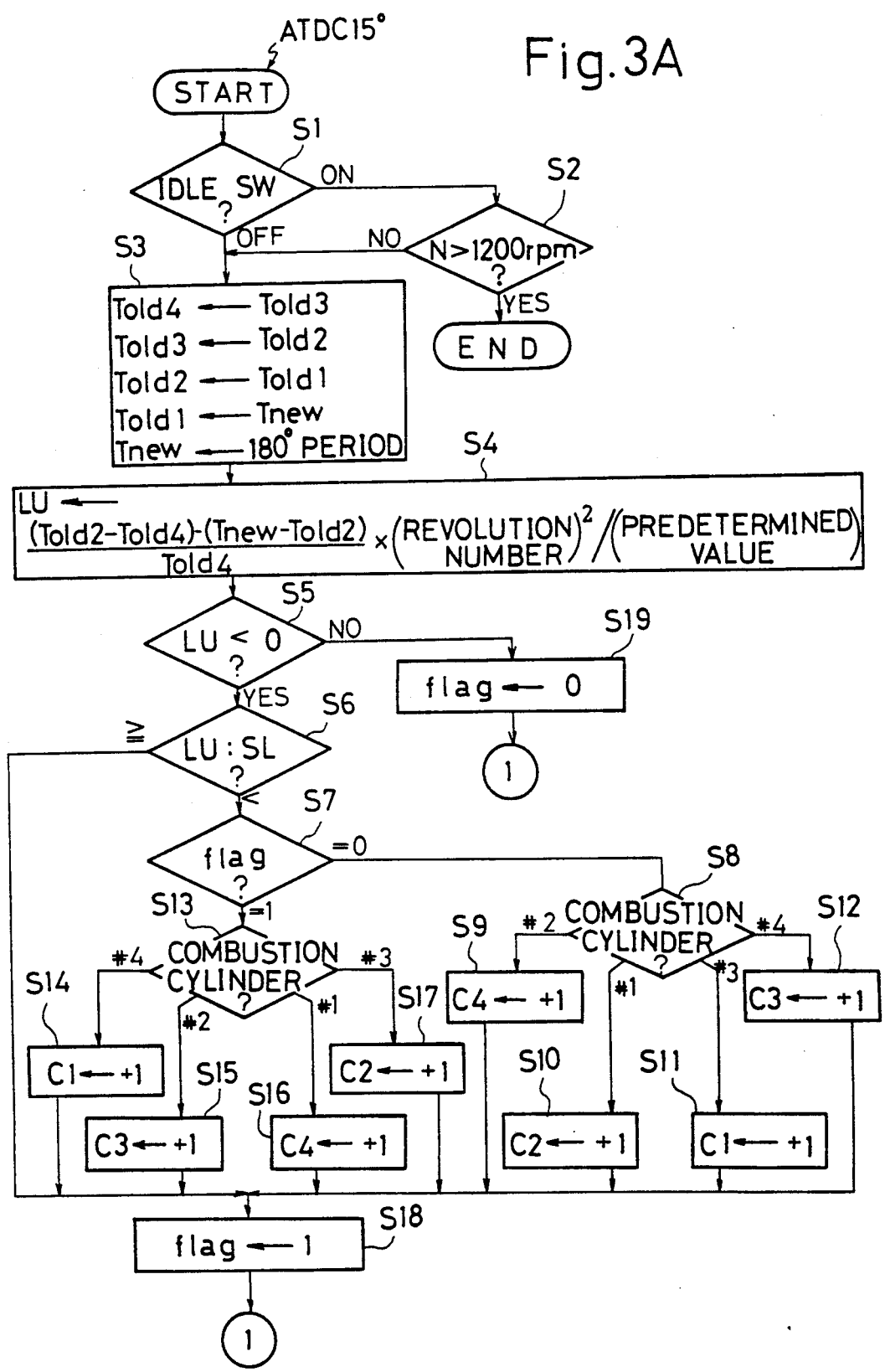
FIGS. 3 to 5 (including parts 3A, 3B, 4A and 4B) are flow charts illustrating how to control the detection of a misfire cylinder according to the first embodiment.

Referring to FIGS. 2 to 9, a description will be given of the first embodiment of a method and apparatus for detecting a misfired cylinder of an internal combustion engine according to the present invention; the first embodiment comprises components shown in the block diagram of FIG. 1.

In FIG. 2 which illustrates the system structure of the first embodiment, a four-cycle four-cylinder internal combustion engine 1 comprises a crank shaft (not shown) on which a signal disc plate 2 is installed. The disc plate 2 is made from a magnetic material and has 120 tooth like projections formed on the periphery thereof at intervals of every 3 degrees of crank angle (3° CA). An electromagnetic pickup 3 is fixed near the periphery of the disc plate 2 to detect the projections of 3° CA in such a way that an open end of the magnet of the pickup 3 is opened and closed by the projections of the disc plate 2 according to the rotation of the crank shaft so that induced electromotive pulse signals are obtained. That is, a detection signal is generated at an interval of every 3° CA by the function of the disc plate 2 cooperating with the pickup 3.

Also, on a side surface of the signal disc plate 2 are formed a pair of bumps 2a and 2b which are coaxially disposed on the same circle about the rotary shaft. An electromagnetic pickup 4 is disposed facing the side surface of the disc plate 2. The pickup 4 detects the TDC by detecting the bumps 2a and 2b so that a induced electromotive pulse signals are obtained at an interval of every 180° CA. That is, a detection signal is generated at an interval of every 180° CA by the function of the bumps 2a and 2b of the disc plate 2 cooperating with the pickup 4.

In that case, the detection position of the pickup 4 is arranged so that the bumps 2a and 2b are detected at the timing synchronized with the top dead center (TDC) position, whereby the TDC position of the compression stroke in each cylinder can be detected from, for example, the ignition signal and the TDC detection signal.

The induced electromotive forces outputs from the pickups 3 and 4 are respectively input to corresponding zero-cross comparators 5 and 6 in each of which the induced electromotive force is converted to a pulse wave having a zero voltage center according to the level of the induced electromotive force with respect to the 0 V level. These pulse waves are further shaped to have a low level of 0 V by associated waveform shaping circuits 7 and 8 connected to the comparators 5 and 5, respectively.

The waveform shaping circuit 7 outputs a pulse signal which rises (or falls) at an interval of 3° CA (referred to as 3° CA pulse hereinafter). The 3° CA pulse signal output from the circuit 7 is input to a timer-1 of a control unit 9 which includes a computer that executes the misfire cylinder detecting operation and controls the fuel supply to the engine 1. The timer-1 counts the pulse number of the 3° CA pulse signal.

Also, the other waveform shaping circuit 8 outputs a pulse signal which rises (or falls) at an interval of 180° CA at the position of TDC in each cylinder (referred to as TDC pulse hereinafter). The TDC pulse signal output from the circuit 8 is input to a trigger-1 of the control unit 9.

Further, the control unit 9 receives an ON/OFF signal from an idle switch 11 which is rendered on at the fully-closed position of a throttle valve 10 disposed in an air suction system of the engine 1, i.e., the idling position.

The control unit 9 measures the period of the TDC pulse signal, that is, the period of 180° CA (TDC) for the four-cylinder engine 1 of this embodiment. The control unit 9 also counts the 3° CA pulses by using the TDC pulse as a trigger and detects the timing of an interrupt operation for executing the misfire detection program at around, for example, ATDC 15°, so as to detect the misfire cylinder at an interval of 180° CA period.

It is to be noted that as the means for detecting the rotational position of the crank shaft, instead of the above mentioned type of means utilizing the induced electromotive pulses, an optical means may be used in which slits are formed in the signal disc plate so that the rotational position of the crank shaft is detected by detecting the light penetrating through the slits of the disc plate.

A misfire cylinder detecting program in accordance with a first embodiment of the present invention is described hereinafter with reference to the flow chart of FIG. 3. The program is executed interrupting the computer operation at the timing right after TDC which is detected by counting the 3° CA pulses in response to the TDC pulse.

Figure 3B:
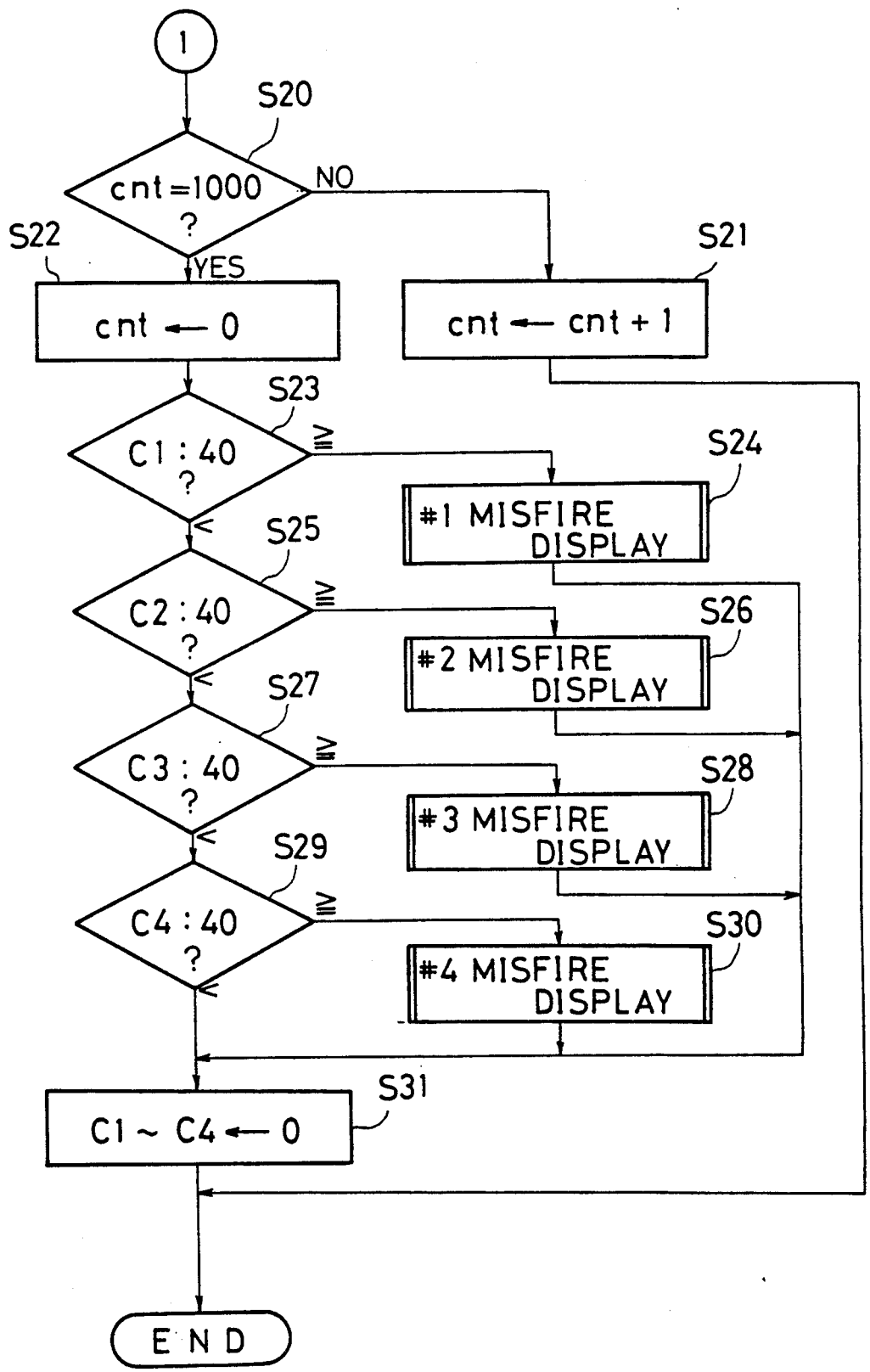

It is to be noted that of the individual constituent elements of present invention, the misfired cylinder detecting means and the misfire detection inhibiting means are provided as means to be realized by software in the control unit 9, as illustrated in FIG. 3. The fully-closed state detection in the embodiment corresponds to the idle switch 11, and the angular velocity detecting means is realized by a sensor section constituted by a combination of the bumps 2a and 2b of the signal disc plate 2 and the electromagnetic pickup 4, and the time measuring function of the control unit 9.

First, in step 1 (designated as S1 in FIG. 3, other steps designated in the same way), the ON/OFF status of the idle switch 11 is discriminated. When it is discriminated here that the idle switch 11 is set ON and the throttle valve 10 is fully closed, the flow advances to step 2 where it is discriminated whether or not the engine revolution speed N (crank angular velocity) calculated on the basis of the 180° CA period exceeds a predetermined level (for example, 1200 rpm).

If it is discriminated in step 2 that the engine revolution speed N has exceeded the predetermined level, this program is terminated to inhibit misfire detection.

Figure 7:
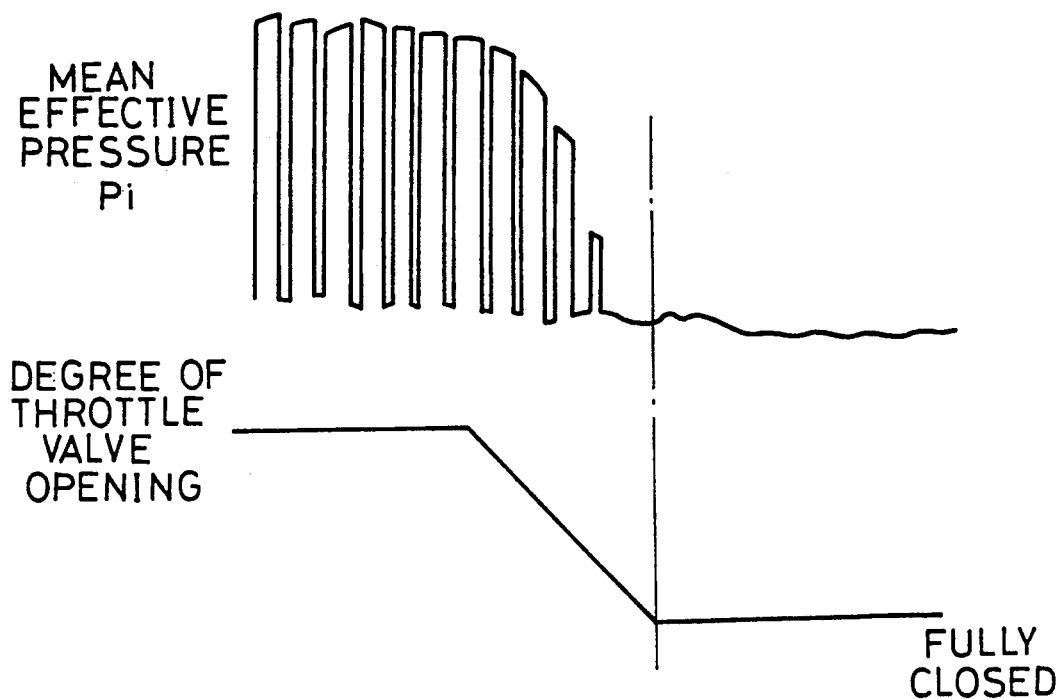
FIG. 7 is a time chart showing how average effective pressure changes by coasting.
Figure 9:
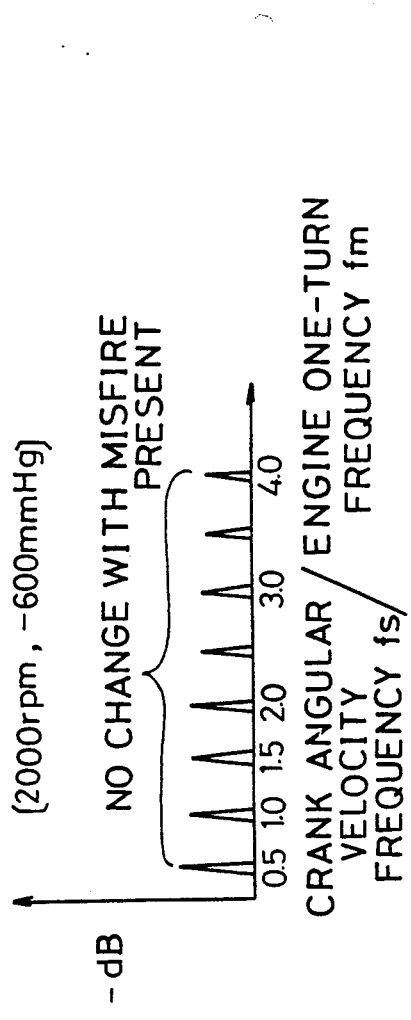

At the coasting time of a vehicle (the transmission is set to the neutral position for inertial driving with the throttle valve fully closed), even if a misfire occurs, a change in mean effective pressure Pi caused by this misfire hardly occurs, nor does the influence of the misfire reflect on the crank angular velocity (see FIGS. 7 and 9). At the coasting time, therefore, a misfired cylinder cannot be detected with high accuracy based on the crank angular velocity, so that when the engine revolution speed N is equal to or greater than a predetermined value, the operational conditions of the engine are considered to include coasting and no detection of a misfired cylinder is executed, thus preventing discrimination of the occurrence or nonoccurrence of a misfire.

If the normal detection of a misfired cylinder is executed at the coasting time, even when the presence of a misfired cylinder has been detected, it will be discriminated that no misfired cylinder exists any more. In warning the driver of the result of the detection, the driver will have the wrong information about the misfire detection, thus impairing the reliability of the misfire detection. In contrast, if the detection of a misfired cylinder is canceled at the coasting time as is done in this embodiment, it is possible to prevent the detection result indicating no misfired cylinder being present from being always output at least at the coasting time, thus improving reliability.

Figure 6:
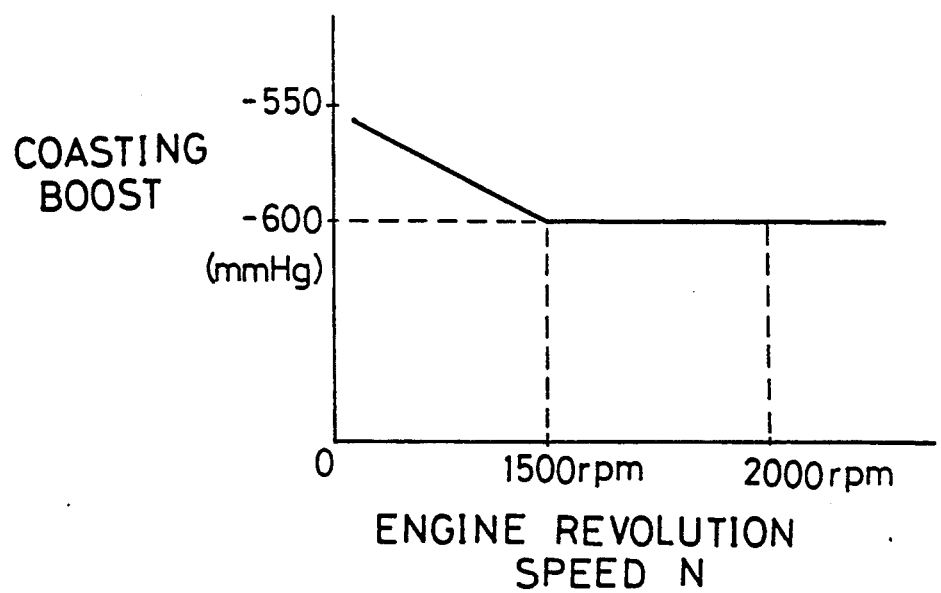
FIG. 6 is a graphical view representing the boost change of the revolution speed at the time of coasting.
Figure 8:
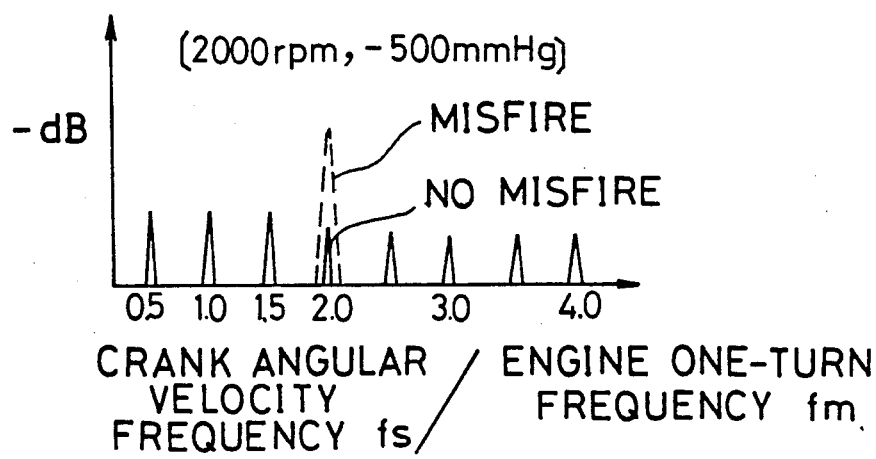
FIGS. 8 and 9 are graphic views showing the proper and improper states of misfire cylinder detection according to different operational conditions of the engine.

Even with the throttle valve 10 fully closed, when the engine revolution speed N is equal to or less than a predetermined level, the boost approximately proportional to the mean effective pressure Pi rises as shown in FIG. 6 and the illustrated mean effective pressure Pi so changes that the occurrence of a misfire can be distinguished (see FIG. 8). With such an operation region considered as the normal misfire detecting region, therefore, the operational region where misfire detection is possible is widened.

Although it may be possible to avoid erroneous detection at the coasting time with only the fully-closed state of the throttle valve as a condition, it is preferable to add the above condition involving the throttle valve N because this increases the chances of detecting a misfired cylinder.

It should be noted that the process consisting of the aforementioned steps 1 and 2 corresponds to the misfire detection inhibiting means in the first embodiment.

When it is discriminated in step 1 that the idle switch 11 is set OFF or it is discriminated in step 2 that the engine revolution speed N is equal to or less than a predetermined level, the illustrated means effective pressure Pi significantly changes due to the occurrence of a misfire and the misfire detection can be executed on the basis of the 180° CA period (crank angular velocity) as shown in FIG. 8. The flow therefore advances to subsequent steps following step 3 inclusive for detection of a misfired cylinder.

In step 3 the TDC period values of the latest value Tnew to Told4 which is the value four times before are renewed and stored; the TDC period (180° for the four-cylinder engine) is measured as the interval of the TDC pulse input signal.

In the subsequent step 4, the misfire discriminating value LU is calculated from the following equation using the latest period Tnew, the one-turn-before Told2 that is the period of ½ cycle before, and the two-turn-before Told4 that is the period of one cycle before, obtained in step 3.

$$LU = \frac{(Told2 - Told4) - (Tnew - Told2)}{Told4} \times \frac{(\text{Revolution No.})^2}{\text{Predetermined Value}}$$

That portion in the equation excluding the multiplier term, (revolution number)²/predetermined value, which is approximately equivalent to the amount of a change in the mean effective pressure Pi shown is calculated. The level of the misfire discriminating value LU computed according to an equation including no compensation term, (revolution number)²/predetermined value), which depends on the revolution number of the engine, greatly differs depending on the engine revolution speed N and shows such a tendency that the lower the revolution speed, the greater the absolute value of the discriminating value LU. Accordingly, the higher the revolution speed, the discriminating value LU is increased more so that approximately the same level of the discriminating value LU will be calculated for each revolution range, thus keeping the precision of the misfire detection based on the discriminating value LU without any influence of the engine revolution speed N. It should be noted that the predetermined value by which the square of the revolution number of the engine is divided serves to match the digits of the discriminating value LU when there is a difference of the number of digits of the revolution number of the engine.

As approximately the same level of the discriminating value LU is calculated for each revolution range in the above manner, the slice level SL can be set constant irrespective of the engine revolution speed.

When the discriminating value LU is set in step 4, it is discriminated in the next step 5 whether or not the discriminating value LU is negative and represents a decrease in mean effective pressure.

When the misfire discriminating value LU is negative, the flow advances to step 6 where the value LU is compared with the preset slice level SL (fixed value).

When the discriminating value LU is discriminated as being below the slice level SL, the flow advances to step 7 where a "flag" is discriminated. A "1" is set in the "flag" in step 18 (to be described later) when the discriminating value LU is negative, whereas the "flag" is reset to "0" when the value LU is zero or greater.

Therefore, when the "flag" is discriminated as zero in step 7, the discriminating value LU is supposed to be discriminated as being below the slice level SL at the initial time when the value LU becomes negative. In this case, on the basis of the latest value LU of this time, the cylinder which has been predicted as the cause to decrease the mean effective pressure Pi shown is presumed to be the misfired cylinder and the flow goes on to step 8.

In step 8, depending on the cylinder which the TDC of right before the compression TDC belongs to, a cylinder in a combustion stroke which influenced the TDC period sampled most recently is specified and the specified cylinder is determined as the misfired cylinder to be detected on the basis of the value LU of this time.

More specifically, for instance, when the compression TDC of this time belongs to the #2 cylinder, and if the ignition order is #1→#3→#4→#2, the combustion stroke takes place in the #4 cylinder right before the compression TDC. The combustion state of the #4 cylinder influences the measurement of the period Tnew based on which the discriminating value LU is calculated.

Therefore, the occurrence of a misfire in the #4 cylinder is detected on the basis of the value LU discriminated as below the slice level SL at this time. Then the flow goes to step 9 where the count value C4 of the counter for counting the misfire occurrence number is incremented by "1."

Similarly, it is assumed that the misfire takes place in the cylinder which is in the combustion stroke immediately before the compression stroke of the cylinder which is associated with the compression TDC of this time. Based on the above assumption, the misfire detection numbers C1 to C3 are incremented for the respective cylinders (steps 10 to 12).

On the other hand, when the "flag" is discriminated as being "1," the "flag" represents the state where the value LU is kept negative. In this case, it was confirmed from experiments that it is correct to specify the misfired cylinder on the basis of the discriminating value LU which firstly becomes negative. Therefore, the cylinder in which the combustion stroke has taken place two times before is detected as a misfired cylinder and the misfire detection numbers C1 to C4 for the respective cylinders are incremented on the basis of the detection result.

In the event that the misfired cylinder is specified and the misfire number of the cylinder is counted up as mentioned above and it is discriminated in step 6 that the misfire discriminating value LU is negative but is equal to or greater than the slice level SL, a "1" is set in the "flag" in step 18.

Also, when the discriminating value LU is discriminated as being equal to or larger than zero in step 5, the flow advances to step 19 where a "0" is set in the "flag."

After the flag is set in step 18 or 19, the flow moves to step 20 where the count value "cnt" of the counter for counting the execution number of the program is compared with a predetermined value, for example, 1000.

In this case, when the count value "cnt" is less than the predetermined value, the value "cnt" is incremented by "1" in step 21 and the program is terminated. When the value "cnt" has reached the predetermined value, the value "cnt" is reset to zero in step 22. After that, the misfire occurrence is displayed for that cylinder whose misfire detecting ratio is discriminated as being a predetermined value or greater in steps 23 to 30.

In step 23, the data of C1 in which the misfire detection number of the #1 cylinder is set is compared with a predetermined value (for example, 40) to discriminate whether or not the misfire in the #1 cylinder is detected more than a predetermined number of times. When the count value "cnt" equals or is greater than the predetermined value, the flow advances to step 24 where the misfire occurrence of the #1 cylinder is displayed on the dashboard of the vehicle on which the engine 1 is mounted, warning the driver of the occurrence of such an event.

Similarly, the data of C2 to C4 in which the misfire detection numbers of the #2 to #4 cylinders are respectively registered are compared with a predetermined value to thereby discriminate whether or not the misfire frequency of each cylinder is higher than a predetermined value. If there is a cylinder in which the misfire occurs more than the predetermined number of times, the occurrence of the misfire for this cylinder is displayed in the same way as mentioned above (steps 25 to 30).

After the misfire frequency of each cylinder is discriminated by comparing the misfire count values C1 to C4 with the predetermined value, respectively, C1 to C4 are reset to zero in step 31. After that, new data of the misfire detection number for each cylinder during a predetermined period in which the count value "cnt" is incremented to a predetermined value, is set in each of C1 to C4.

The individual processes of steps 53 to 72 in the flow chart shown in FIG. 3 correspond to the misfired cylinder detecting means.

Figure 4A:
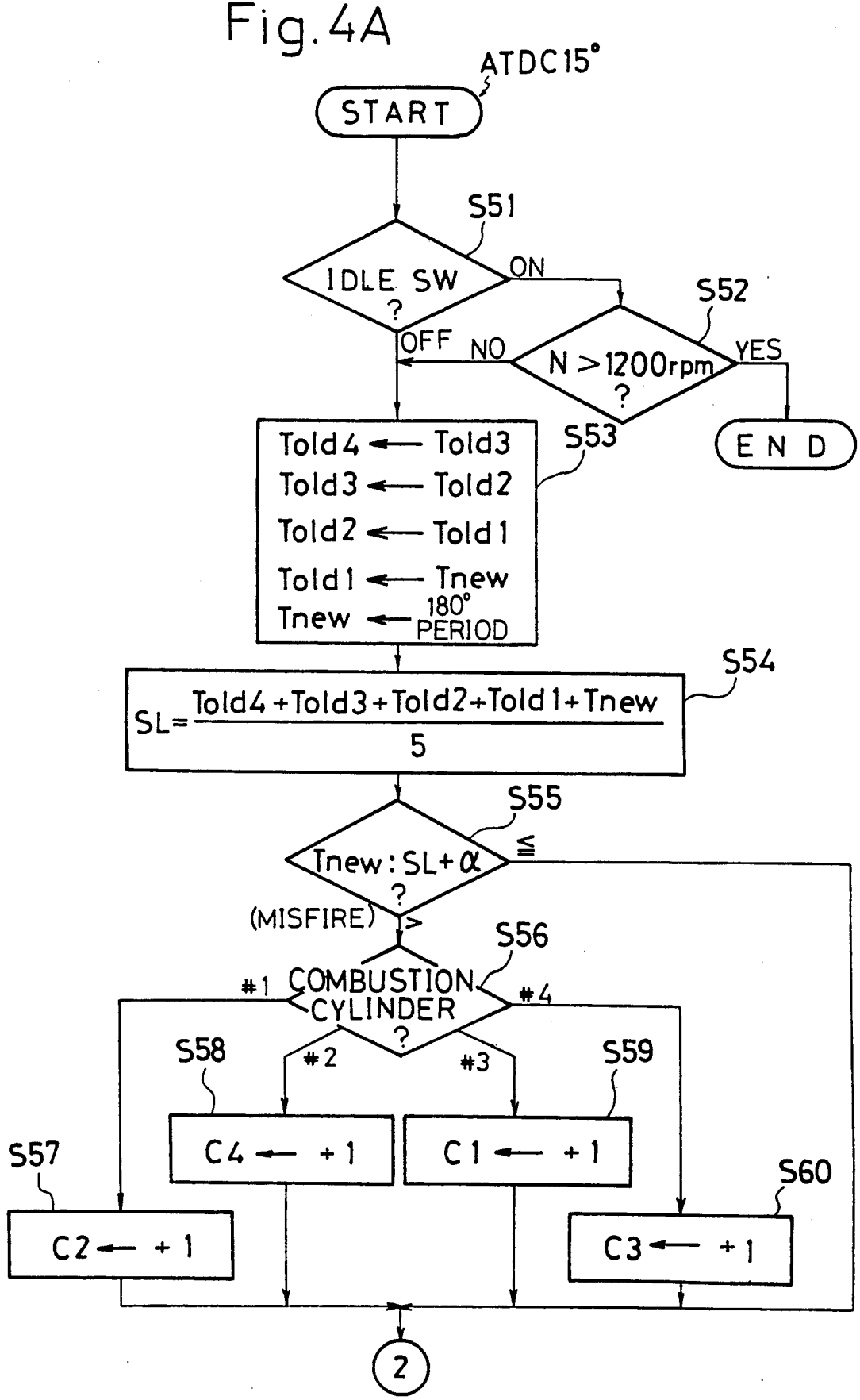
Figure 4B:
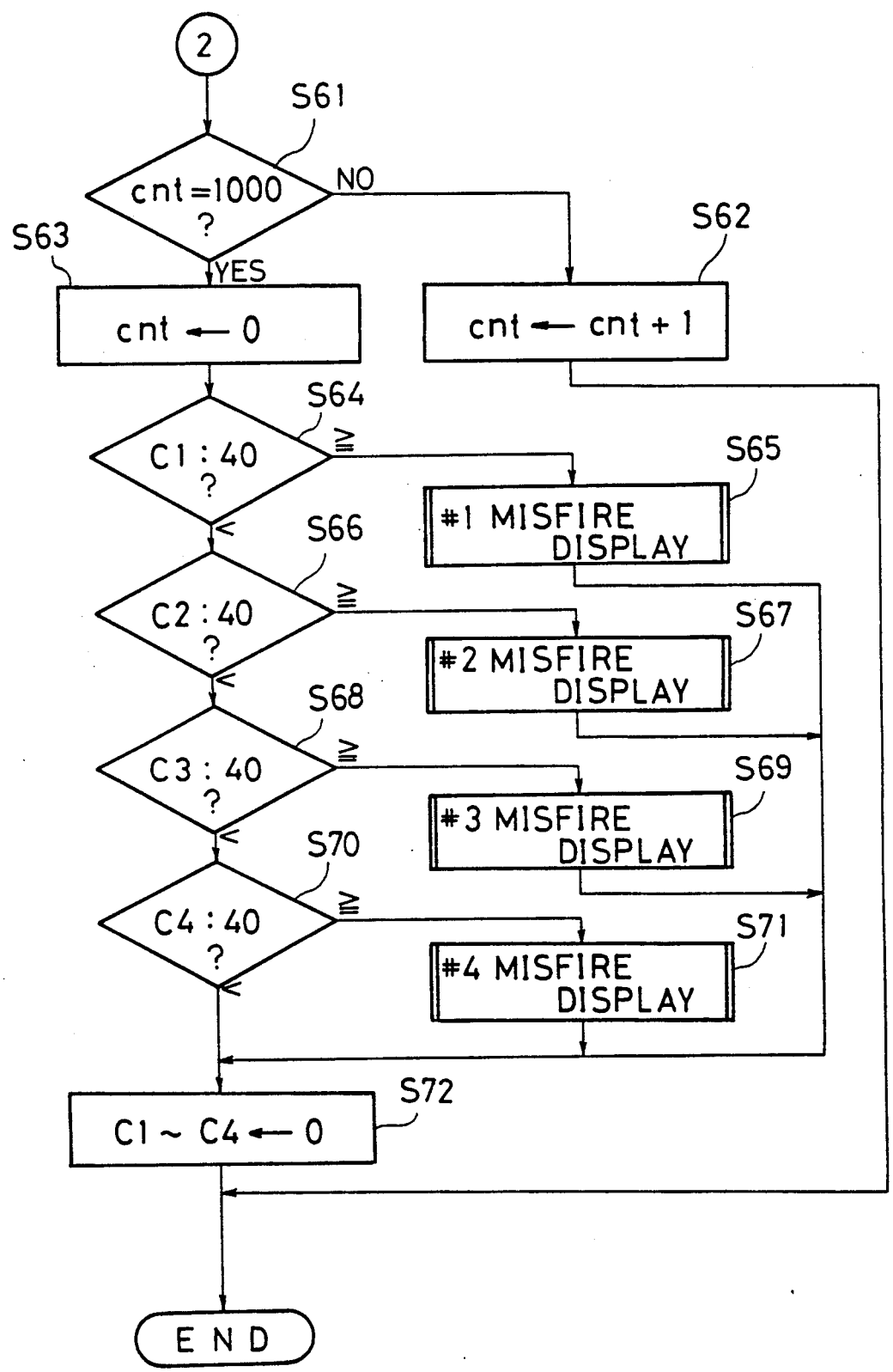

The misfire detection is not limited to the instance based on the misfire discriminating value LU, but may be executed according to whether the revolution period T increases to a predetermined value or above as illustrated in the flow chart in FIG. 4. In this example, the functions illustrated in the flow chart in FIG. 4 correspond to the misfired cylinder detecting means and the misfire detection inhibiting means, which are constituent elements shown in FIG. 1.

The program shown in the flow chart in FIG. 4, like the one shown in the flow chart in FIG. 3, is executed for each ATDC 15°. First, in steps 51 and 52 as in the aforementioned steps 1 and 2, it is discriminated whether or not the detection inhibiting conditions such that the throttle valve 10 is fully closed and the engine revolution speed N is equal to a predetermined level or greater are satisfied.

When the conditions for inhibiting the misfire detection are not satisfied, the flow advances to the sequence of steps starting from step 53 to execute misfire discrimination.

In step 53 as in the aforementioned step 3, the values of the TDC period (180° for the four-cylinder engine) of the latest value Tnew to Told4 which is the value four times before are renewed and stored; the TDC period is measured as the interval of the TDC pulse input signal.

In the next step 54 the average value of the TDC periods of the latest Tnew to Told4 which is the value four times before is acquired and is set as the slice level SL.

In the subsequent step 55 the slice level SL acquired as the average period plus a predetermined deviation $\alpha$ which is variably set with the engine load and the engine revolution speed as parameters, is compared with the latest period Tnew.

Figure 5:
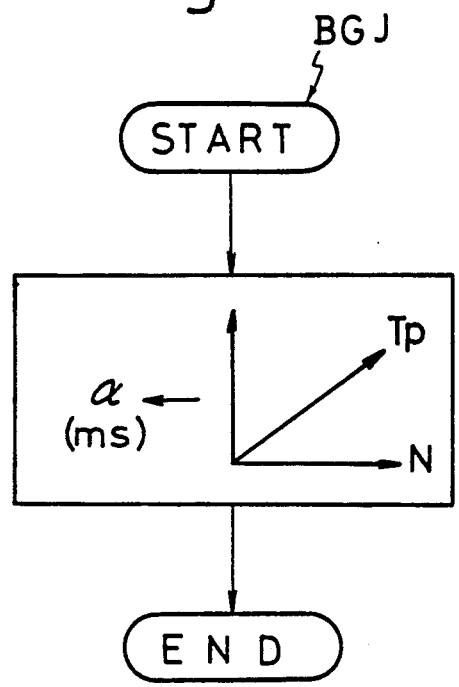

The predetermined deviation $\alpha$ which is set in the background process by the program illustrated in the flow chart in FIG. 5, is retrieved from a map having the predetermined deviation $\alpha$ stored for each operation range distinguished by a parameter representing the engine load, such as the basic fuel injection amount Tp or the like set by, for example, an electronically-controlled fuel injector, and a parameter "engine revolution speed N," based on the latest engine load and engine revolution speed N. This predetermined deviation $\alpha$ permits the accuracy of the misfire detection for each operational condition to be maintained in accordance with the difference of period changing level at the time a misfire occurs.

If Tnew > Sl + $\alpha$ in step 55, which means that Tnew has a deviation equal to or greater than a predetermined level and exceeds the average period, it is assumed that the latest period Tnew has increased to or above the predetermined level due to the reduction in the internal pressure of the cylinder caused by the misfire. The occurrence of the misfire is therefore discriminated and the flow advances to step 56.

In step 56 the cylinder which is presently in the combustion stroke process is discriminated, and that cylinder which has been ignited before the former cylinder is considered as the misfired cylinder.

In other words, with the ignition order being #1→#3→#4→#2, when the #2 cylinder is presently in the combustion stroke process, the latest period Tnew is considered as indicating that the TDC period overlapping in the previous combustion stroke process of the #4 cylinder is being measured. The #4 cylinder is therefore discriminated to be the misfired cylinder, and C1 to C4 indicating the misfire detection numbers of the respective cylinders are incremented (steps 57 to 60) as is done for C1 to C4 shown in the flow chart in FIG. 3.

If it is discriminated in step 55 that Tnew > SL + $\alpha$ the latest period Tnew does not have a deviation equal to or greater than a predetermined value with respect to the average period, and it is discriminated that no misfire has occurred. The flow then jumps over steps 56–60 to step 61.

The steps following step 61 inclusive are for displaying a misfired cylinder based on the misfire detecting ratio as in steps 20–31 in the flow chart shown in FIG. 3, so that their description will be omitted here.

As mentioned above, in accordance with this embodiment of the present invention, when the misfire frequency of a cylinder becomes more than a predetermined value, the cylinder is displayed and an alarm is provided. However, it is to be noted that in addition to such a display and alarm function, a fail-safe control may be executed such as by stopping the fuel supply to the misfired cylinder.

Although in the above-described embodiment, a misfire in a four-cylinder internal combustion engine is detected, the same may be applied to a six-cylinder or an eight-cylinder engine as well or a more complex discrimination logic may be used in a misfire detection based on a misfire discriminating value LU as long as the misfire detection is based on the crank angular velocity.

Referring now to FIGS. 11 to 17, a description will be given of the second embodiment of a method and apparatus for detecting a misfired cylinder of an internal combustion engine according to the present invention; this embodiment comprises the individual components shown in the block diagram of FIG. 10.

Figure 11:
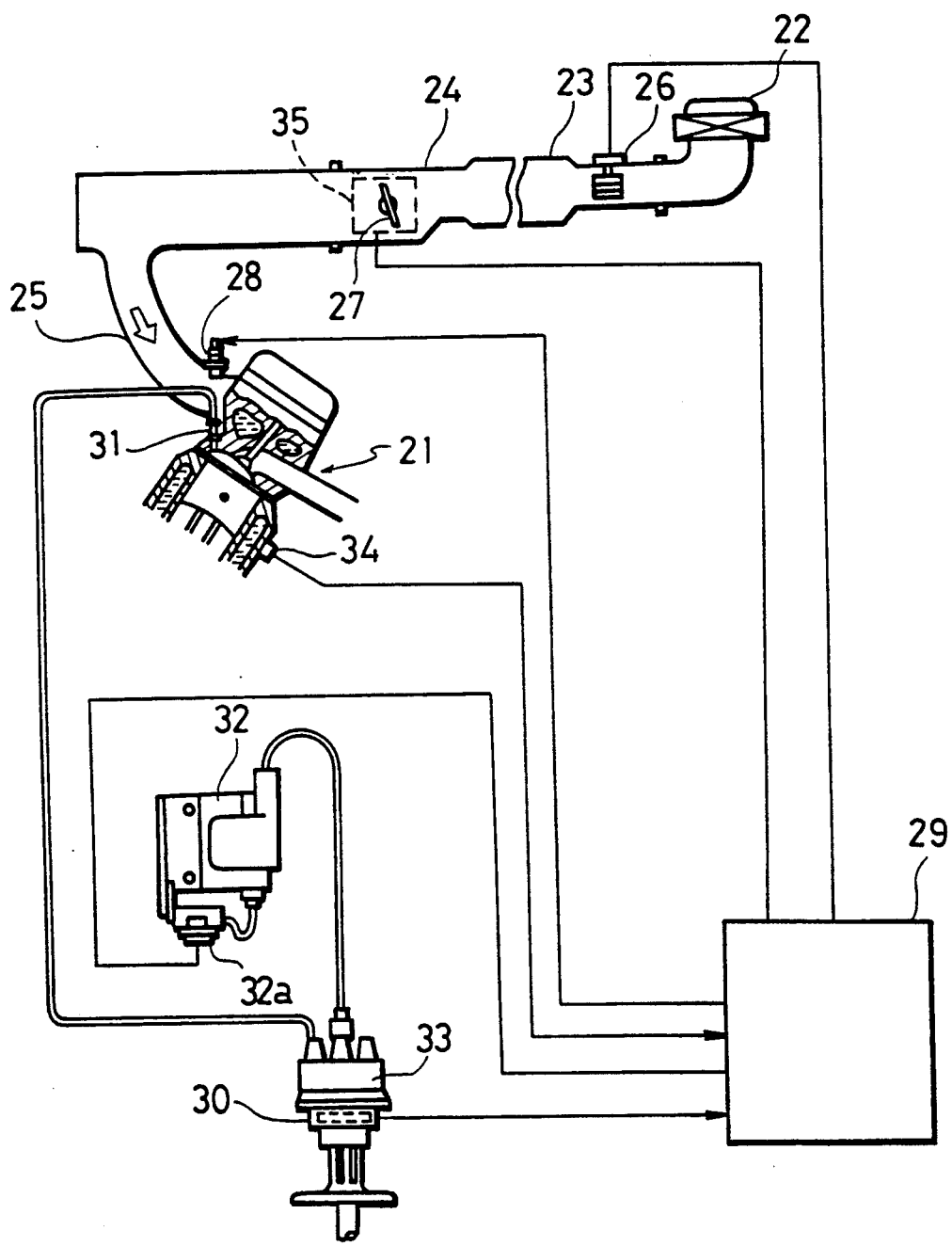
FIG. 11 is a schematic diagram of a system according to the second embodiment.

Referring to FIG. 11 illustrating the system structure of the second embodiment, air is sucked into an internal combustion engine 21 through an air cleaner 22, an inlet duct 23, a throttle chamber 24 and an air intake manifold 25.

An airflow meter 26 is provided in the inlet duct 23 to detect the flow rate of sucked air Q. In the throttle chamber 24 is disposed a throttle valve 27 which interlocks with an acceleration pedal (not shown) to control the sucked air flow rate Q. An electromagnetic type fuel injection valve 28 is provided in the intake manifold 25 for each cylinder (four cylinders in this embodiment) to inject fuel, compressed by a fuel pump (not shown) and controlled to have a predetermined pressure, into the manifold 25.

A microcomputer-incorporated control unit 29 computes a basic fuel injection amount $Tp = K \times Q/N$ (K: constant) corresponding to the opening time of the fuel injection valve 28 from the sucked air flow rate Q detected by the airflow meter 26 and an engine revolution speed N computed on the basis of a signal from a crank angle sensor 30 incorporated in a distributor 33, compensates this basic fuel injection amount Tp based on a cooling water temperature Tw, detected by a water temperature sensor 34, etc. to compute a final fuel injection amount Ti, and sends a drive pulse signal having a pulse width corresponding to the amount Ti to the fuel injection valve 28 in synchronism with engine revolution, whereby the requested amount of fuel is injected into the engine 21.

On the individual cylinders of the engine 21 are provided ignition plugs 31 to which a high voltage induced by an ignition coil 32 is sequentially supplied via the distributor 33 (the ignition order is #1→#3→#4→#2) to cause a spark to burn the air/fuel mixture. The timing for inducing a high voltage by the ignition coil 32 is controlled by a power transistor 32a connected to the coil 32. The control of ADV (ignition timing advance) is executed by controlling the ON/OFF timing of the power transistor 32a in accordance with an ignition control signal from the control unit 29.

The control unit 29 searches a map having the ignition timing advance ADV stored in advance for each of multple operational ranges distinguished by the basic fuel injection amount Tp and the engine revolution speed N, for a specific ignition timing advance ADV corresponding to the operational conditions of the engine, and outputs the ignition control signal based on the advance ADV to thereby control the advance ADV.

The throttle valve 27 is provided with a throttle sensor 35 to detect the opening TVO by means of a potentiometer. The crank angle sensor 30 outputs a reference angle signal REF for each 180° (for each BTDC 70° in this embodiment) in the four-cylinder engine, and a unit angle signal POS for 1° or 2°. The signal REF serves as the reference position of the ignition timing control done for each cylinder by the control unit 29.

The control unit 29 serves as a misfired cylinder detecting device which detects a misfired cylinder according to the present invention and displays an indication of the misfired cylinder near the driver's seat in a vehicle. The misfired cylinder detection control will be explained according to the programs illustrated in the flow charts given in FIGS. 12 through 16.

Figure 10:
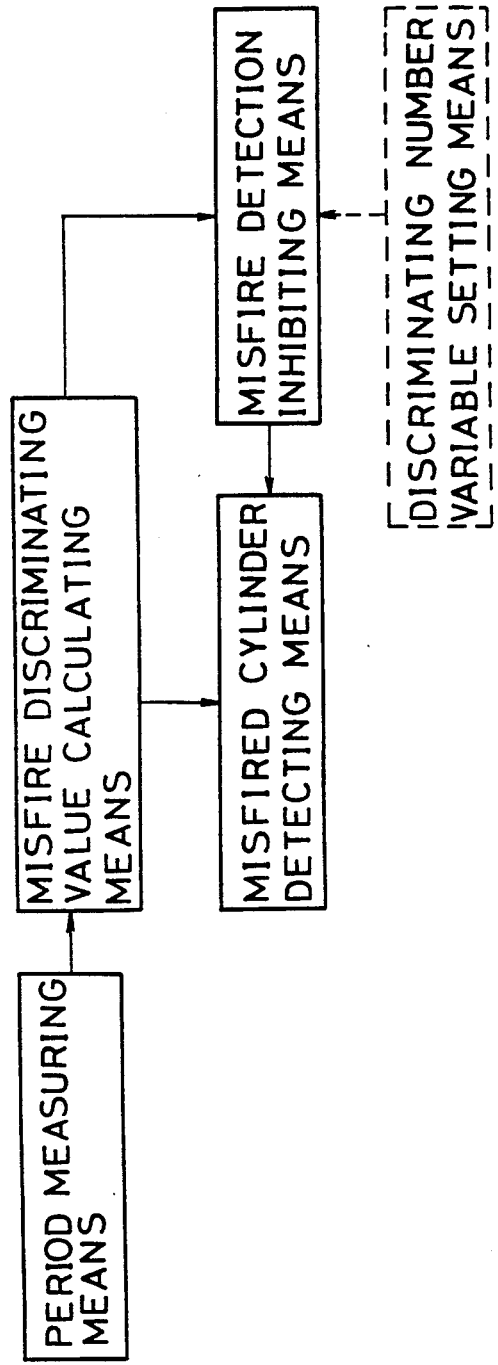
FIG. 10 is a block diagram illustrating individual components of the second embodiment of the present invention.

It is to be noted that of the individual constituent elements of the second embodiment shown in FIG. 10, the misfire discriminating value calculating means, the misfired cylinder detecting means, the misfire detection inhibiting means and the discriminating number variable setting means are provided as software in the control unit 29, as illustrated in the flow charts given in FIGS. 12 to 16. The period measuring means in this embodiment is constituted by the crank angle sensor 30 and the control unit 29.

Figure 12B:
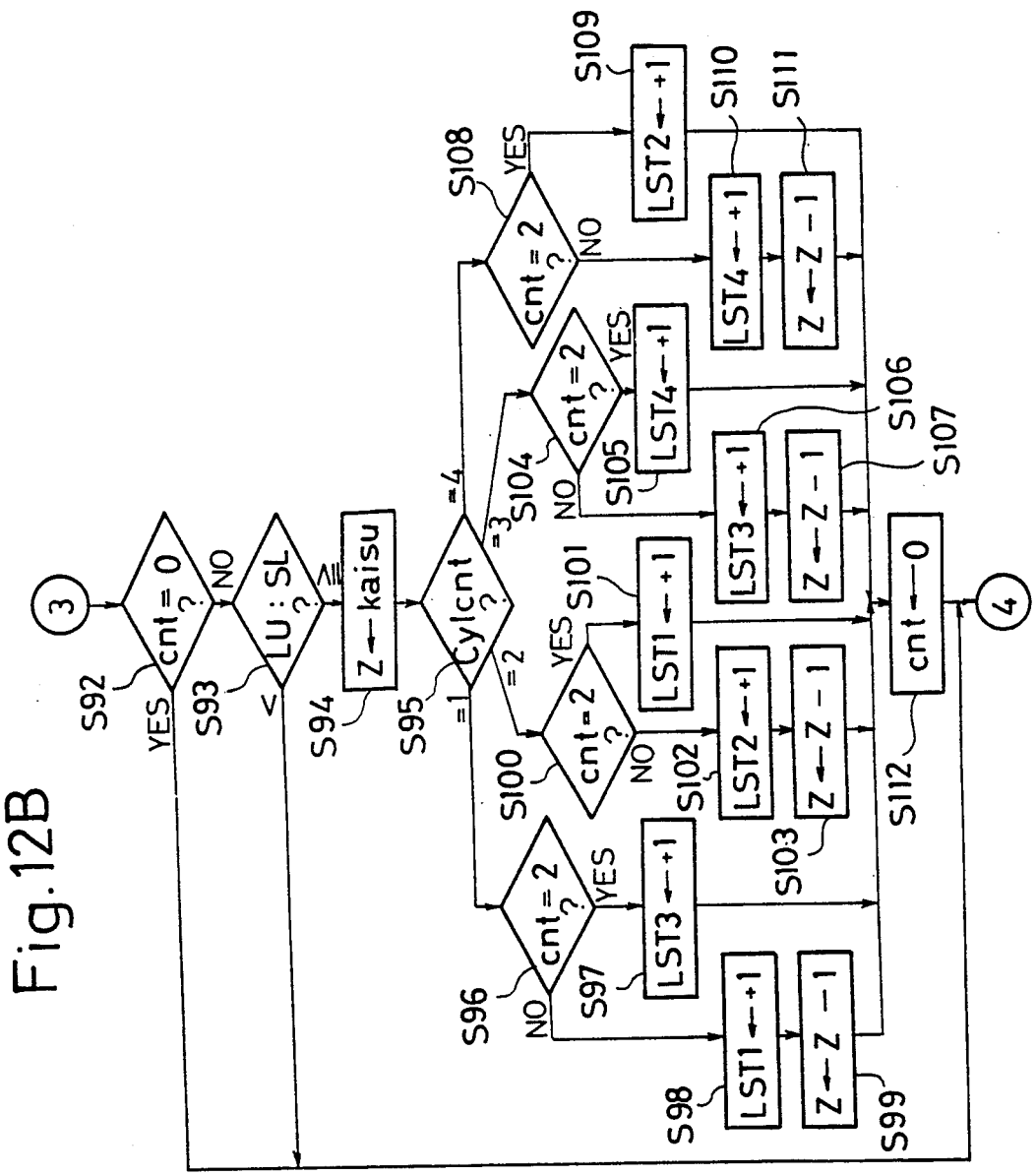
FIGS. 12 to 16 (including parts 12A, 12B and 12C) are flow charts illustrating how to control the detection of a misfire cylinder according to the second embodiment.
Figure 12C:
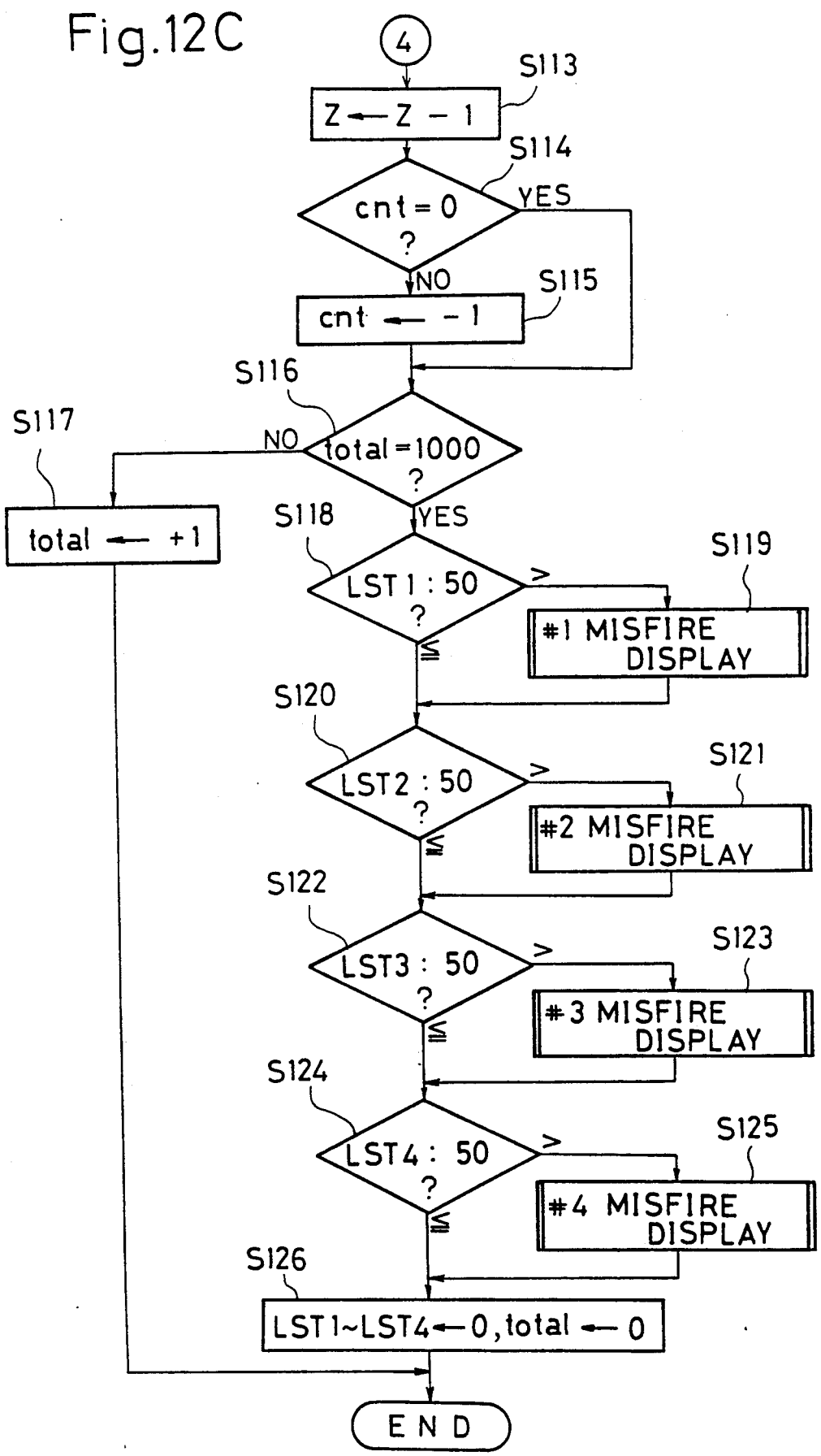

The program illustrated in the flow chart in FIG. 12 is executed for each position of 15° after compression TDC (ATDC 15°) of each cylinder which is detected by counting the unit angle signal POS from the reference angle signal REF.

First, in step 81 the results of measuring the periods from ATDC 20° to ATDC 180° (the angle range in which the crank angular velocity is influenced particularly by a change in cylinder pressure) according to another program (not shown) are stored in time series.

Figure 17:
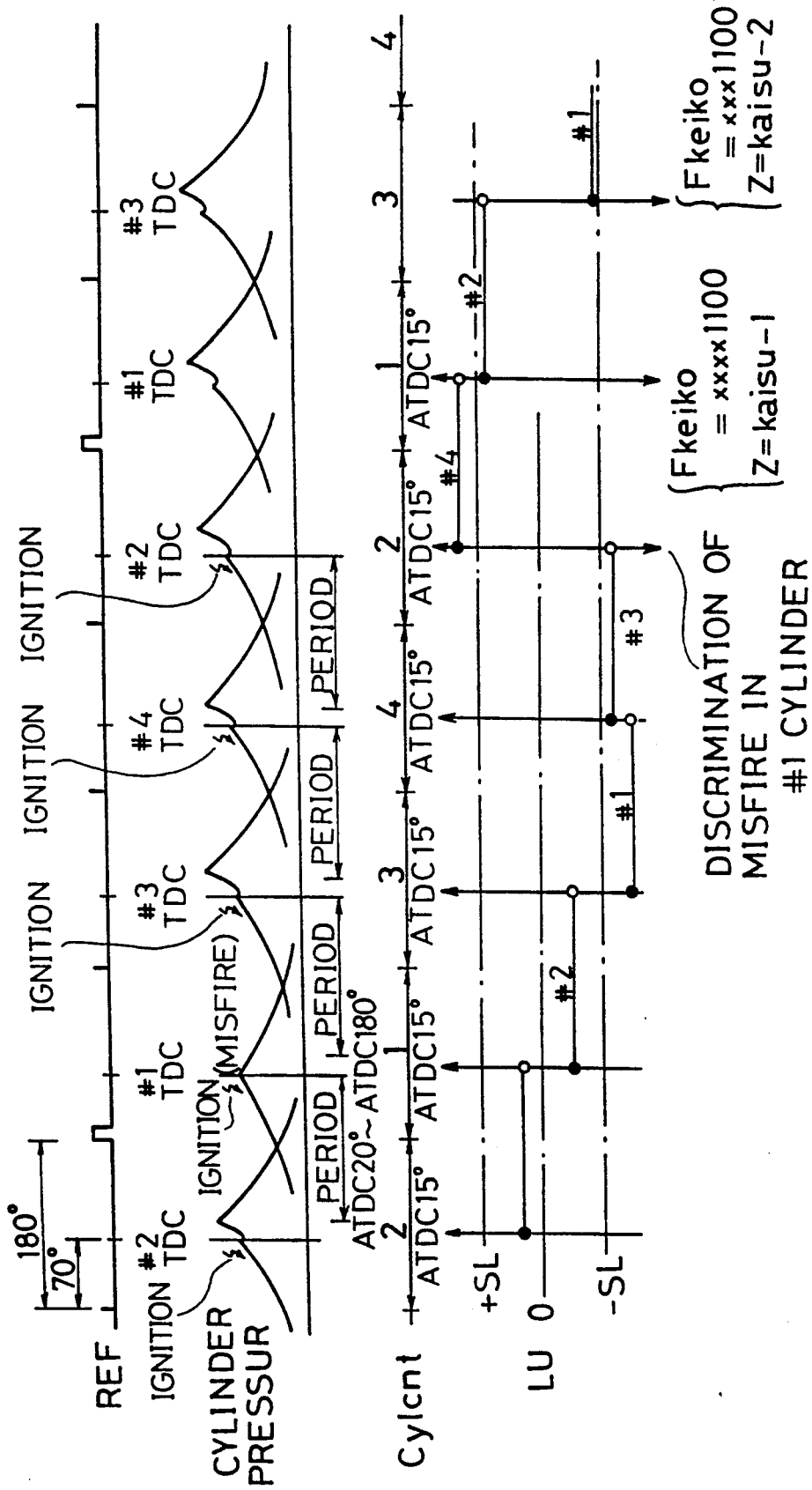
FIG. 17 is a time chart showing the characteristic of the misfire cylinder detection according to the second embodiment.

More specifically, the control unit 29 detects the positions of ATDC 20° and ATDC 180° based on the signal output from the crank angle sensor 30 and measures the time duration (period) therebetween, as shown in FIG. 17. In this step 81 five pieces of period data from the latest period T0 to the period T4 four times before are updated and set.

In the next step 82 the misfire discriminating value LU is calculated from the following equation using the latest period T0 the one-turn-before period T2 that is the period of ½ cycle before, and the two-turn-before period T4 that is the period of one cycle before, obtained in step 81.

$$LU = \frac{(T2 - T4) - (T0 - T2)}{T4}$$

The discriminating value LU approximately corresponds to the amount of a change in mean effective pressure, and a change in mean effective pressure of that cylinder which has been in the combustion stroke process during measurement of the latest period T0 is assumed from this value LU.

In step 83 it is determined whether or not the positive/negative inversion pattern of the misfire discriminating value LU matches a specific pattern at the time of misfire occurrence. If the discriminating value LU does not invert in a predetermined pattern, the value LU is compensated to be zero (compensated in the direction to reduce the absolute value of LU), thereby preventing erroneous detection of a misfired cylinder based on the misfire discriminating value LU influenced by the rotational fluctuation after the misfire occurrence.

Figure 13:
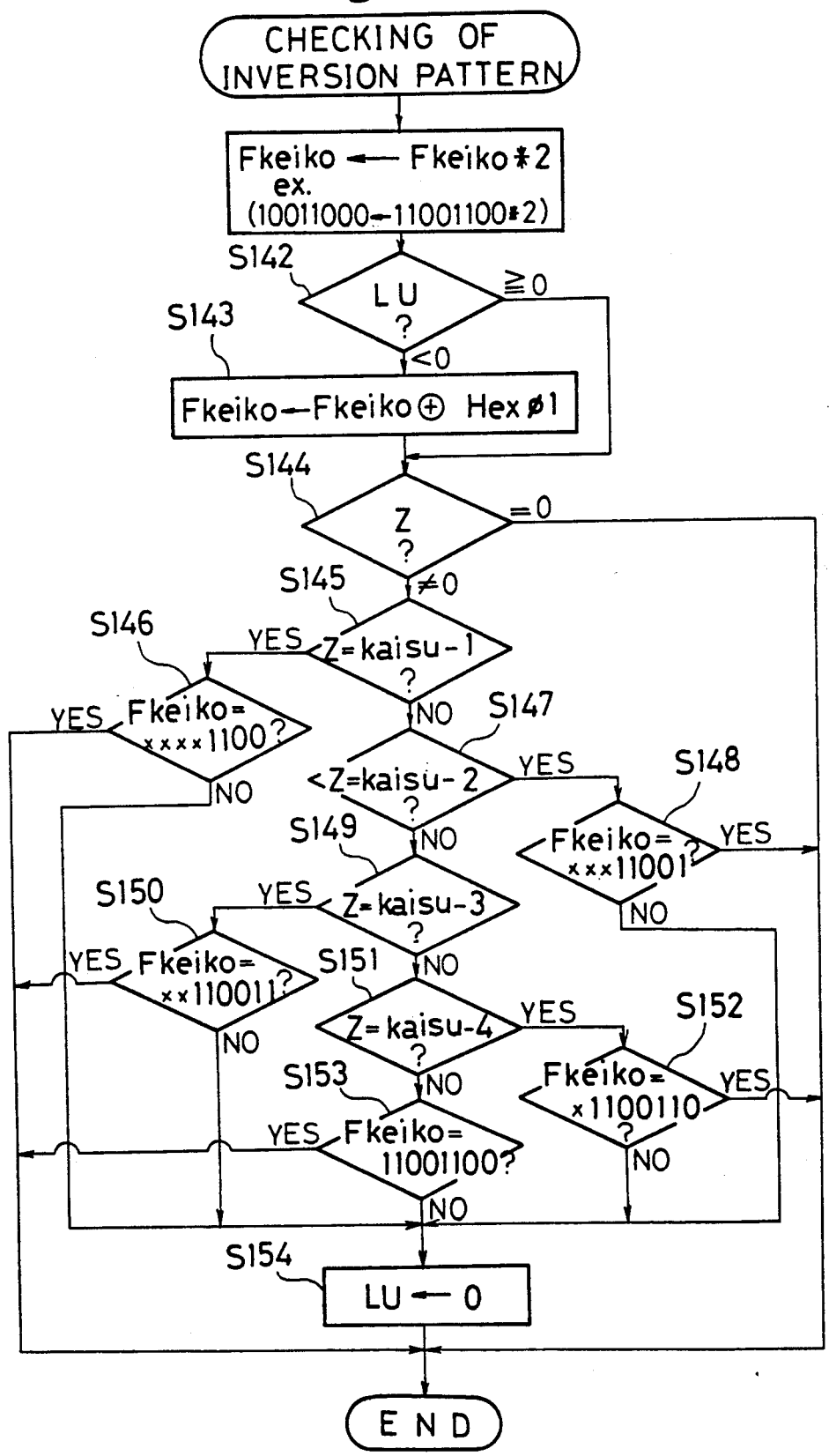

A flow chart in FIG. 13 illustrates a program for checking such a positive/negative inversion pattern of the misfire discriminating value LU.

In step 141, given that the positive misfire discriminating value LU is "0" and the negative value LU is "1", an 8-bit flag Fkeiko wherein the positive/negative of the last eight discriminating values LU have been set in time series, is multiplied by "2," and is shifted to the left by one bit.

In other words, the flag Fkeiko has positive/negative data set in the newer-to-older order from the least significant bit to the most significant bit. As it is desired to set the latest positive/negative data in the least significant bit, the positive/negative data of the latest calculated misfire discriminating value LU is set in the least significant bit in this step 141.

In the subsequent step 142, it is discriminated if the misfire discriminating value LU calculated this time in step 82 is negative. When the latest value LU is negative, "1" is set in the least significant bit of the flag Fkeiko in step 143. When the latest value LU is "0" or greater, the flow jumps over step 143, leaving the least significant bit to "0".

It is determined in the next step 144 whether or not a discriminating number Z is "0." The discriminating number Z represents the quantity of time series data of the misfire discriminating value LU used for discriminating if the positive/negative inversion pattern of the value LU matches a predetermined pattern, i.e., a discriminating number for determining how many old inversion patterns misfire discriminating values LU should be compared with the predetermined pattern.

When the discriminating number Z is "0," it is assumed that the engine 1 revolves a predetermined number of times after the detection of the misfire, and a rotational fluctuation caused by the occurrence of the misfire is converging, so that checking the inversion pattern is not executed. The positive/negative inversion pattern of the misfire discriminating value LU is detected in a flow following step 145 inclusive only when the number Z is not zero.

In step 145, it is determined whether or not the discriminating number Z is a value acquired by subtracting "1" from a positive/negative discriminating number "kaisu" after misfire detection at which the discriminating number Z is set according to the engine revolution speed N.

Figure 16:
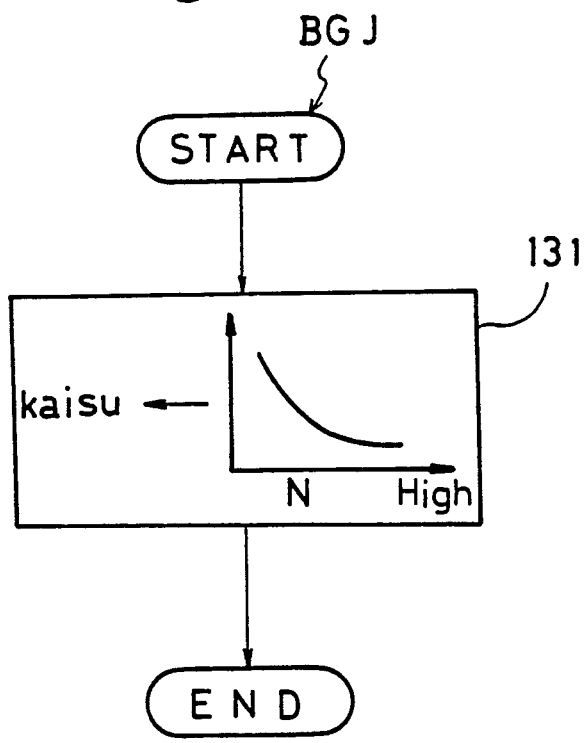

The number "Kaisu" of chances for the positive/negative discriminating after the misfire detection is set after retrieval from a map, set in advance according to the engine revolution speed N, in step 131 of the program which is executed in the background as shown in the flow chart in FIG. 16. The slower the speed N, the greater the number "kaisu" is set this time. This is because the lower the revolution speed, the longer the rotational fluctuation caused by the occurrence of the misfire continues, so that the positive and negative inversion of the misfire discriminating value LU is monitored longer as the revolution speed is slower, thereby preventing erroneous detection of a misfired cylinder.

As will be described later, according to this embodiment, a misfired cylinder is discriminated based on the discrimination logic according to which a misfired cylinder corresponding to the discriminating value LU one engine turn before from the first inversion is detected as a misfired cylinder when the misfire discriminating value LU is inverted from negative to positive one time or two times after the discriminating values LU which are consecutively equal to or below the negative slice level SL, and when the discriminating value LU of the first inversion or the next inversion exceeds the positive slice level SL. When misfire is detected on the basis of such logic, the aforementioned "kaisu" is set to the discriminating number Z, and the number Z is decremented according to how many times before the point of calculating the discriminating value LU corresponding to the actual misfired cylinder is.

In a case shown in FIG. 17, for example, when the discriminating value LU corresponding to the #4 cylinder is calculated, the #1 cylinder is specified as a misfired cylinder. After the "kaisu" is set to the discriminating number Z this time, the number Z is decremented by "1." Therefore, when the discriminating value LU corresponding to the #2 cylinder is computed and the flow advances to step 83, "Z=kaisu−1", and the flow goes from step 145 to step 146.

In step 146, it is determined if the lower four bits of the flag Fkeiko are 1100, or if the discriminating value LU has changed from negative to negative to positive to positive during the last four times with the misfire discriminating value LU corresponding to on misfired cylinder being the top. When the misfire occurs in the four-cylinder internal combustion engine, the discriminating value LU corresponding to the misfired cylinder becomes negative as shown in FIG. 17. Further, it is proven from experiments that the following values are inverted negative to positive to positive. In this step, therefore, it is determined that the discriminating value LU has really changed along this pattern.

When the lower four bits of the flag Fkeiko is determined not to be 1100 (normally when the last bit of the flag Fkeiko is determined to be "1"), the positive/negative inversion of the discriminating value LU is not done along the predetermined positive/negative inversion pattern after the occurrence of the misfire. It is therefore assumed that the inversion pattern of the discriminating value LU differs from the predetermined pattern due to the rotational fluctuation caused by the misfire occurrence. In this case, therefore, the rotational fluctuation after the misfire occurrence has affected the calculation of the misfire discriminating value LU this time, so that if the misfire discrimination is performed on the basis of this discriminating value LU, erroneous discrimination of the misfired cylinder may occur. In this respect, the flow advances to step 154 to set a "0" for the misfire discriminating value LU, thus preventing the present discriminating value LU from affecting the misfire discrimination.

When it is determined in step 145 that Z=kaisu−1 is not met, it is then discriminated in step 147 whether or not Z=kaisu−2. If Z=kaisu−2, and no misfire is discriminated following the setting of "Z=kaisu−1", with the negative misfire discriminating value LU corresponding to the misfired cylinder being on top, the discriminating value LU should change from negative to positive to positive to negative (11001) according to the predetermined positive/negative inversion pattern. In this case, it is determined in step 148 if the lower five bits of the flag Fkeiko is 11001.

If there is no influence of the rotational fluctuation after the misfire occurrence in this case, the lower five bits of the flag Fkeiko should be 11001. Unless the five bits correspond to the predetermined pattern, therefore, the computed misfire discriminating value LU is regarded as affected by the rotational fluctuation. To avoid erroneous misfire discrimination based on this misfire discriminating value LU, a "0" is also set for the value LU in step 154.

Likewise, when Z=kaisu−3 (step 149), it is determined in step 150 if the six misfire discriminating values from the latest value to the one five times before are changed along the predetermined positive/negative inversion pattern (110011). When Z=kaisu−4 (step 151), it is determined in step 152 if the seven consecutive misfire discriminating values from the latest value to the one six times before have changed along the predetermined pattern (1100110). Further, when Z is smaller than "kaisu−4", it is determined in step 153 whether or not the eight misfire discriminating values LU from the latest value to the one seven times before, which number is the largest confirmable number using the flag Fkeiko, have changed along the predetermined pattern (11001100).

When these misfire discriminating values LU have not changed according to the predetermined positive/negative inversion pattern, the flow advances to step 154 where the value LU is reset to "0," thus inhibiting the misfire discrimination.

The discriminating number Z is decreased each time the program shown by the flow chart in FIG. 12 is executed. When the positive/negative discriminating number kaisu which corresponds to the engine revolution speed N after the misfire discrimination is set to the number Z, and the positive/negative inversion pattern of the misfire discriminating value LU is detected by the number according to the "kaisu," the discriminating number Z is counted down to "0," and the process for inhibiting the detection of the misfired cylinder based on the positive/negative inversion pattern will not be carried out.

As described above, depending on whether or not the misfire discriminating value LU corresponding to the misfired cylinder changes along the positive/negative inversion pattern, it is determined whether the misfire discriminating value LU is influenced by the rotational fluctuation caused by the discontinuous misfire occurrence of a specific cylinder. If the changing pattern is different from the predetermined pattern at the time of the misfire occurrence, setting the misfire discriminating value LU to zero can prohibit the misfired cylinder from being discriminated based on the discriminating value LU affected by the rotational fluctuation after the occurrence of the misfire.

When the "kaisu" is set variable according to the engine rotation speed N, the positive/negative inversion pattern can be detected in association with the period in which the rotational fluctuation after the misfire occurrence continues. The erroneous discrimination of the misfire can be well avoided at the time of slow revolutions in which the fluctuation continues longer. At the time of high revolutions in which the rotational fluctuation promptly converges, the detection of the positive/negative inversion pattern of the misfire discriminating value LU is immediately canceled (Z immediately becomes zero) to be able to cope with the detection of a misfire in other cylinders.

Returning to the flow chart in FIG. 12, as described above, the positive/negative inversion pattern of the misfire discriminating value LU corresponding to a misfired cylinder detected is discriminated, and the misfire discriminating value LU which is presumed to have been influenced by the rotational fluctuation after the misfire occurrence, is reset to zero, thereby inhibiting the misfire discrimination as affected by the rotational fluctuation. In the subsequent steps starting from step S84, the misfired cylinder is detected on the basis of the misfire discriminating value.

In step 84, it is discriminated whether or not the calculated misfire discriminating value LU is zero or greater; if the value LU is negative, the flow advances to step 85 where a "0" is set to the flag Fplus for discrimination of the positive/negative inversion of the misfire discriminating value LU.

Figure 15:
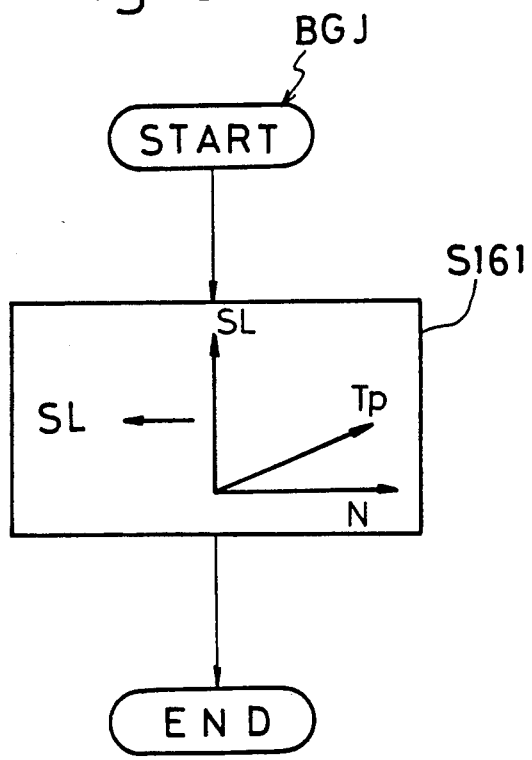

In the next step 86 the slice level SL set as a positive value in the program illustrated in the flow chart in FIG. 15 is decreased from zero to be a negative value (0−SL), and this negative slice level SL is compared with the misfire discriminating value LU.

The program illustrated in the flow chart in FIG. 15 is executed in the background. In step 161 of this program the slice level SL matching the latest operational conditions of the engine is retrieved from a map having slice levels SL stored in advance for multiple operational ranges separated by the basic fuel injection amount Tp representing the engine load and the engine revolution speed N, and is set.

The slice level SL is set variable in accordance with the engine load and the engine revolution speed N in the above manner because the level of the misfire discriminating value LU significantly changes according to the operational conditions of the engine, the engine load and engine revolution speed N.

If the discriminating value LU is discriminated to be equal to or less than the negative slice level SL in step 86, a "4" is set to the count value cnt in step 87 before the flow advances to step 113. If the discriminating value LU is discriminated to be equal to zero or above (i.e., positive), the flow jumps over step 87 to step 113.

In step 113 the discriminating number Z is decremented by "1" to permit discrimination of whether the positive/negative inversion pattern of the discriminating value LU matches the predetermined pattern by the number corresponding to the engine revolution speed N, starting from the discriminating value LU corresponding to the misfire-detected cylinder.

In the next step 114 it is discriminated whether or not the count value cnt is zero; if the value cnt is not zero, it is decremented by "1" in step 115. If the misfire discriminating value LU continues to be negative, therefore, a "4" is set to the count value cnt when the value LU becomes equal to the negative slice level SL or below, and is decremented by "1" at the same time. The value cnt will be kept decremented to zero and will hold zero unless the discriminating value LU becomes equal to or less than the negative slice level SL thereafter.

If the discriminating value LU is discriminated to be zero or greater in step 84, the flag Fplus is discriminated in step 88. If the flag Fplus is zero and the discriminating value LU computed upon previous execution of this program is negative, that is, if the discriminating value LU is inverted from negative to positive, a "1" is set to the flag Fplus in step 89, and the flag Fplus is discriminated to be "1" in step 88 when the discriminating value LU is still zero or greater next time.

In the next step 90 it is discriminated whether or not the count value cnt is "3." When it is the first inversion of the discriminating value LU from negative to positive and the value cnt is "3," in which case the discriminating value LU equal to or less than the negative slice level SL is inverted to a positive discriminating value LU, a "2" is set to the value cnt in step 91.

In step 92 it is discriminated whether or not the count value cnt is zero; if it is not zero, the flow advances to step 93 where the discriminating value LU is compared with the positive slice level SL variably set in accordance with the engine load (basic fuel injection amount Tp) and the engine revolution speed N by the program illustrated in the flow chart in FIG. 15.

When the discriminating value LU is greater than the positive slice level SL, the occurrence of a misfire is discriminated. Then, "kaisu" according to the engine revolution speed N (number of times to check the inversion pattern of the discriminating value LU) is set to the discriminating number Z in step 94 while a misfired cylinder is specified and the misfire detection numbers LST1 to LST4 for the respective cylinders are counted up in the subsequent steps 95-111.

First, in step 95, to specify a cylinder having a misfire, the value of a cylinder counter Cylcnt indicating the ignited cylinder is discriminated.

Figure 14:
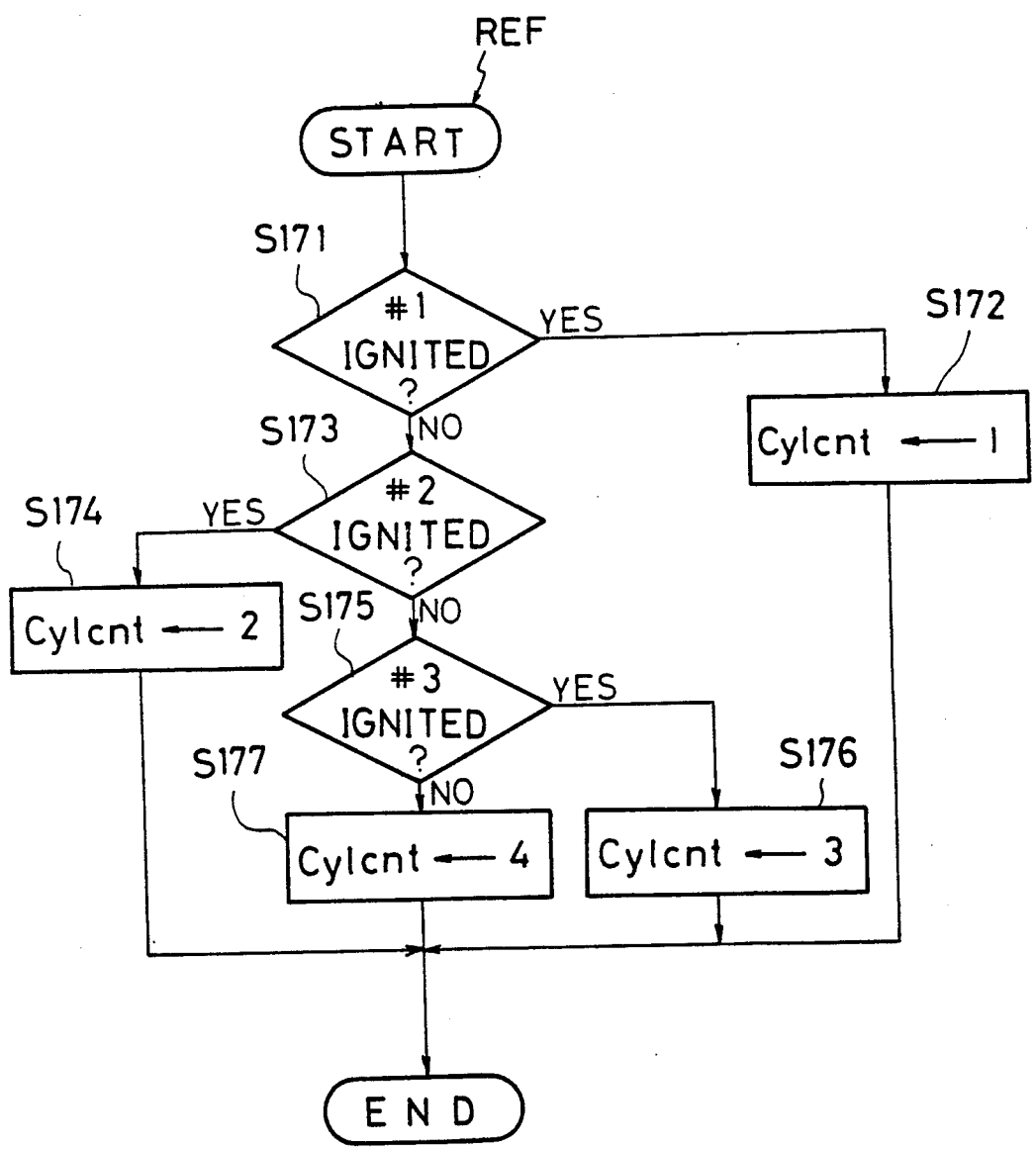

The cylinder counter Cylcnt is set according to the program illustrated in the flow chart in FIG. 14. This illustrated program is executed every time the reference angle signal REF is output from the crank angle sensor 30 (i.e., for each BTDC 70°). The program discriminates the number of the cylinder whose ignition timing ADV (ignition timing advance) is to be controlled next with the present reference angle signal REF as a reference, and sets the cylinder number to the cylinder counter Cylcnt (see steps 171-177).

Returning again to the flow chart in FIG. 12, the "Cylcnt" set in the above manner is discriminated in step 95. If Cylcnt=2, for example, the flow advances to step 100 where it is discriminated whether or not the count value cnt is "2." If it is "2," it is determined that the #1 cylinder is misfiring and the LST1 for counting the misfire detection number for the #1 cylinder is incremented by "1" in step 101.

FIG. 17 illustrates an actual example wherein a misfire in the #1 cylinder is discriminated in this manner. More specifically, as shown in FIG. 17, if the discriminating value LU is calculated with the #1 cylinder having a misfire, a "4" is set to the count value cnt when the discriminating value LU corresponding to the #1 cylinder is calculated to be equal to or less than the negative slice level SL, and the count value is immediately decremented by "1" to be "3". A "3" is set again in the count value cnt when the discriminating value LU corresponding to the next #3 cylinder is equal to or less than the negative slice level SL.

When the discriminating value LU corresponding to the #4 cylinder exceeds the positive slice level SL is inverted from negative to positive, a "2" is set to the count value cnt. Since the count value cnt is not zero and the discriminating value LU exceeds the positive slice level SL, the flow advances to step 93. In step 95 it is discriminated that Cylcnt=2, and the misfire in the #1 cylinder is finally determined.

There may be a case where the first discriminating value LU inverted to positive and corresponding to the #4 cylinder does not exceed the positive slice level SL and the next discriminating value LU corresponding to the #2 cylinder exceeds the positive slice level SL. In this case, at the first inversion from negative to positive, the flow advances from step 93 through step 113 to step 114 and the count value cnt is discriminated not to be zero (count value cnt=2), and the count value cnt is decremented by "1" to be "1" in step 115. When the next discriminating value LU exceeds the positive slice level SL, the flow advances from step 88 to step 92, and, as the count value cnt is "1," the flow moves to step 93 for detection of a misfire. Since a "1" is in Cylcnt this time, the flow goes to step 96. As the count value cnt is "1," the flow then moves from step 96 to step 98 where a misfire in the #1 cylinder is also finally determined and the misfire detection number LST for the #1 cylinder is incremented by "1."

In the example shown in FIG. 17, there may be a case where only either the discriminating value LU corresponding to the #1 cylinder or the discriminating value LU corresponding to the #3 cylinder becomes equal to or less than the negative slice level SL. In this case too, at the first inversion of the discriminating value LU, a "2" is set to the count value cnt so that the misfire in the #1 cylinder can be discriminated.

The example shown in FIG. 17 is a pattern generated at the time of an unstable low revolution speed, such as at the idling time. If a misfired cylinder is to be detected using such a discrimination logic that when any of consecutively negative misfire discriminating values LU is equal to or less than the negative slice level SL, the cylinder corresponding to the first negative discriminating value LU is regarded as the misfired cylinder, the #2 cylinder would be detected as a misfired cylinder in the example shown in FIG. 17. According to the discrimination logic of this embodiment, the misfire in the #1 cylinder is correctly detected in the above-described manner.

It is of course possible to correctly detect a misfired cylinder using the discrimination logic of the second embodiment even when the engine is stable and the rotational fluctuation naturally occurs.

The discrimination logic in this embodiment is determined in view of the fact that upon occurrence of a misfire, the misfire discriminating values LU corresponding to a consecutive half of an even number of cylinders become negative and the discriminating values LU corresponding to the second half of the cylinders continuously become positive (negative negative positive positive along the ignition order in the four-cylinder engine of this embodiment). According to this discrimination logic, a cylinder corresponding to a misfire discriminating value of one engine turn before from a first inversion of a misfire discriminating value from negative to positive is detected as a misfired cylinder, when the misfire discriminating values corresponding to half of the consecutive cylinders in an ignition order are negative, misfire discriminating values corresponding to a remaining second half of the cylinders are positive, at least one of the consecutive negative misfire discriminating values is equal to or less than the negative slice level, and at least one of the consecutive positive misfire discriminating values exceeds the positive slice level.

It is to be noted that in a case where a discriminating value equal to or less than the negative slice level SL is calculated, it has been confirmed through experiments that normally the discriminating values LU corresponding to half of an even number of cylinders (two consecutive cylinders in the four-cylinder engine) consecutively become negative while the discriminating values LU corresponding to the second half of cylinders consecutively become positive. According to this embodiment, that of the consecutively negative misfire discriminating values which is equal to or less than the negative slice level SL is used as a reference in detecting a misfired cylinder.

When the count value cnt is not discriminated to be "2" then a misfired cylinder is specified in the above misfire detection, the discrimination of the misfired cylinder will be delayed by one time compared with the case of the count value cnt being "2." To reflect this on the detection of the positive/negative inversion pattern of the misfire discriminating value, when a misfired cylinder is specified with the count value cnt discriminated not to be "2," the discriminating number Z is decremented by "1" at the same time so as to set the same discriminating number Z as in the case where the misfired cylinder is specified with the count value cnt being "2."

After the misfired cylinder is specified in steps 95 to 111 and the misfire detection numbers LST1-LST4 for the respective cylinders are counted up, the flow advances to step 112 where the count value cnt is reset to zero. As a result, when the next discriminating value LU is also positive and the flow advances to step 92 from step 88, it is discriminated in this step 92 that the count value cnt=0, thus inhibiting the misfire detection.

In step 113, the discriminating number Z is decremented by "1" for updating. When a misfired cylinder is specified with the count value cnt discriminated not to be "2," therefore, "kaisu" is set to the discriminating number Z and "2" is subtracted therefrom to make Z=kaisu 2. When a misfired cylinder is specified with the count value cnt discriminated to be "1," Z=kaisu−1. "kaisu" will not be set to the discriminating number Z until the next misfire is detected, and decrementing of the discriminating number Z by "1" in step 113 is performed upon each execution of this program.

In the next step 114 it is discriminated whether or not the count value cnt is zero; if the count value cnt is not zero, it is decremented by "1" in step 115.

In the subsequent steps starting from step 116, the display of a misfire occurrence for each cylinder is controlled on the basis of the frequency of occurrence of misfires in each cylinder which is discriminated by the misfire detection numbers LST1-LST4.

First, in step 116 it is discriminated whether or not a count value total or counting the number of times the present program is to be executed or the number of discrimination of the presence/absence of a misfire reaches a predetermined value (e.g., 1000). If the count value total has not reached the predetermined value, the flow advances to step 117 where the value total is incremented by "1" and this program is terminated. If the count value total has reached the predetermined value, the occurrence of a misfire for each cylinder is executed in steps 118 to 125 on the basis of the frequency of occurrence of misfires for each cylinder.

In step 118 the LST1 in which the misfire detection number for the #1 cylinder is set is compared with a predetermined value (e.g., 50). When misfires in the #1 cylinder are detected more than a predetermined number of times during a given period to count the count value total up to the predetermined value, the flow advances to step 119 and the misfire occurrence in the #1 cylinder is displayed on an LED display device or the like provided on the dashboard in the vehicle on which the engine 21 is mounted, warning the driver of such an event.

Likewise, the frequencies of occurrence of misfires are discriminated for respective cylinders by comparing LST2-LST4, in which the misfire detection numbers for the #2 cylinder are set, to the #4 cylinder with the predetermined value. With regard to those cylinders in which misfires have occurred more than a predetermined frequency, the misfire occurrence is displayed in the above manner (steps 120-125).

If the misfire detection frequency is discriminated for each cylinder when the count value total has been counted up to the predetermined value, the LST1-LST4 and the value total are reset to zero in step 126, and misfire detection numbers for the individual cylinders until the count value total reaches the predetermined value are set again in LST1-LST4.

Although the engine 21 has four cylinders in the second embodiment, it has been confirmed through experiments that even a six-cylinder engine shows a positive/negative inversion pattern of negative negative negative positive positive positive, for example, with the misfire discriminating value LU corresponding to a misfired cylinder being on top. As in the above embodiment involving the four-cylinder engine, therefore, it is possible to assume that a misfire discriminating value LU is influenced by the rotational fluctuation after a misfire occurrence and shows a changing pattern different from the normal positive/negative inversion pattern, depending on whether or not the misfire discriminating value LU changes along the above-described inversion pattern upon occurrence of a misfire. Based on this assumption, misfire discrimination is prohibited to prevent erroneous discrimination.

In this embodiment the misfire discriminating value LU is reset to zero to inhibit the discrimination of a misfired cylinder when the actually calculated misfire discriminating value does not change along the preacquired positive/negative inversion pattern of the misfire discriminating value LU upon occurrence of a misfire. However, it is possible to multiply the misfire discriminating value LU by a given coefficient to reduce the absolute value of the discriminating value LU to such a level that no misfire discrimination will be done.

Further, instead of using the misfire discrimination logic of the second embodiment, another discrimination logic may be used according to which when consecutively negative misfire discriminating values LUn are calculated and any of them is equal to or below the slice level SL, the cylinder corresponding to the previous misfire discriminating value LUn is regarded as a misfired cylinder. Even in this case, as in the second embodiment, the positive/negative inversion of the misfire discriminating value LU after misfire discrimination is monitored and the misfire detection based on the misfire discriminating value LU affected by the rotational fluctuation is inhibited, thus improving the detection accuracy.

According to the detection of a misfired cylinder using the discrimination logic of the second embodiment, a misfired cylinder may be detected without the need of checking the inversion pattern in step 83 in the flow chart in FIG. 12. The control of the misfire detection with the process of checking the positive/negative inversion pattern of the discriminating value LU omitted from the second embodiment will be presented below as the third embodiment.

According to the third embodiment, as checking the inversion pattern is omitted, a misfired cylinder may be erroneously detected based on the rotational fluctuation after a single, noncontinuous occurrence of a misfire. The detection accuracy can, however, be improved as compared with the case where a large shifting of the misfire discriminating value LU to the negative side is simply discriminated as originating from the misfire.

As already discussed with reference to the second embodiment, the discrimination logic of the third embodiment is such that a cylinder corresponding to a misfire discriminating value of one engine turn before a first inversion of a misfire discriminating value from negative to positive is detected as a misfired cylinder, when misfire discriminating values corresponding to half of the consecutive cylinders of an engine having an even number of cylinders are negative, misfire discriminating values corresponding to a remaining second half of the cylinders are positive, at least one of the consecutive negative misfire discriminating values is equal to or less than a negative slice level, and at least one of the consecutive positive misfire discriminating values exceeds a positive slice level.

According to this logic, even under the situations where a misfire has occurred in an unstable revolution state such as the idling operation and the misfire discriminating value LU corresponding to a nonmisfiring cylinder shifts to the negative side, exceeding the slice level SL as shown in FIG. 17, it is possible to prevent erroneous detection of a misfired cylinder.

As described above, the third embodiment can be realized by the control of the second embodiment from which the process of checking the positive/negative inversion pattern of the misfire discriminating value LU is excluded, i.e., the software structure concerning the misfire detection as illustrated the flow chart in FIG. 12 with steps 83, 94, 99, 103, 107, 111 and 113 being excluded therefrom, and the flow charts in FIGS. 14 and 15, and the hardware structure shown in FIG. 11.

The constituent elements of the third embodiment are illustrated in the block diagram of FIG. 18; the misfire discriminating value calculating means, the misfired cylinder detecting means, and the slice level setting means in FIG. 18 correspond to the software structure of the second embodiment from which the step 83 of checking the positive/negative inversion pattern is excluded, as described above. The period measuring means in FIG. 18 comprises the crank angle sensor 30 and the control unit 29 shown in FIG. 11, while the operational condition detecting means corresponds to the airflow meter 26 and crank angle sensor 30 shown in FIG. 11.

Referring now to FIGS. 20 to 23, a description will be given of the fourth embodiment of a method and apparatus for detecting a misfired cylinder in an internal combustion engine according to the present invention; the fourth embodiment comprises the components illustrated in the block diagram of FIG. 19.

As the system structure of the fourth embodiment is the same as those of the second and third embodiments, the structure will be described referring to FIG. 11. According to the fourth embodiment, the software for detecting a misfire is realized by the flow charts in FIGS. 20 and 21 and the flow chart in FIG. 14 which has already been explained with reference to the second embodiment.

In the fourth embodiment, the control unit 29 has a misfired cylinder detecting function of the present invention. The control of the misfire detection in the fourth embodiment will now be discussed along with the programs illustrated in the flow charts in FIGS. 20 and 21.

Figure 20A:
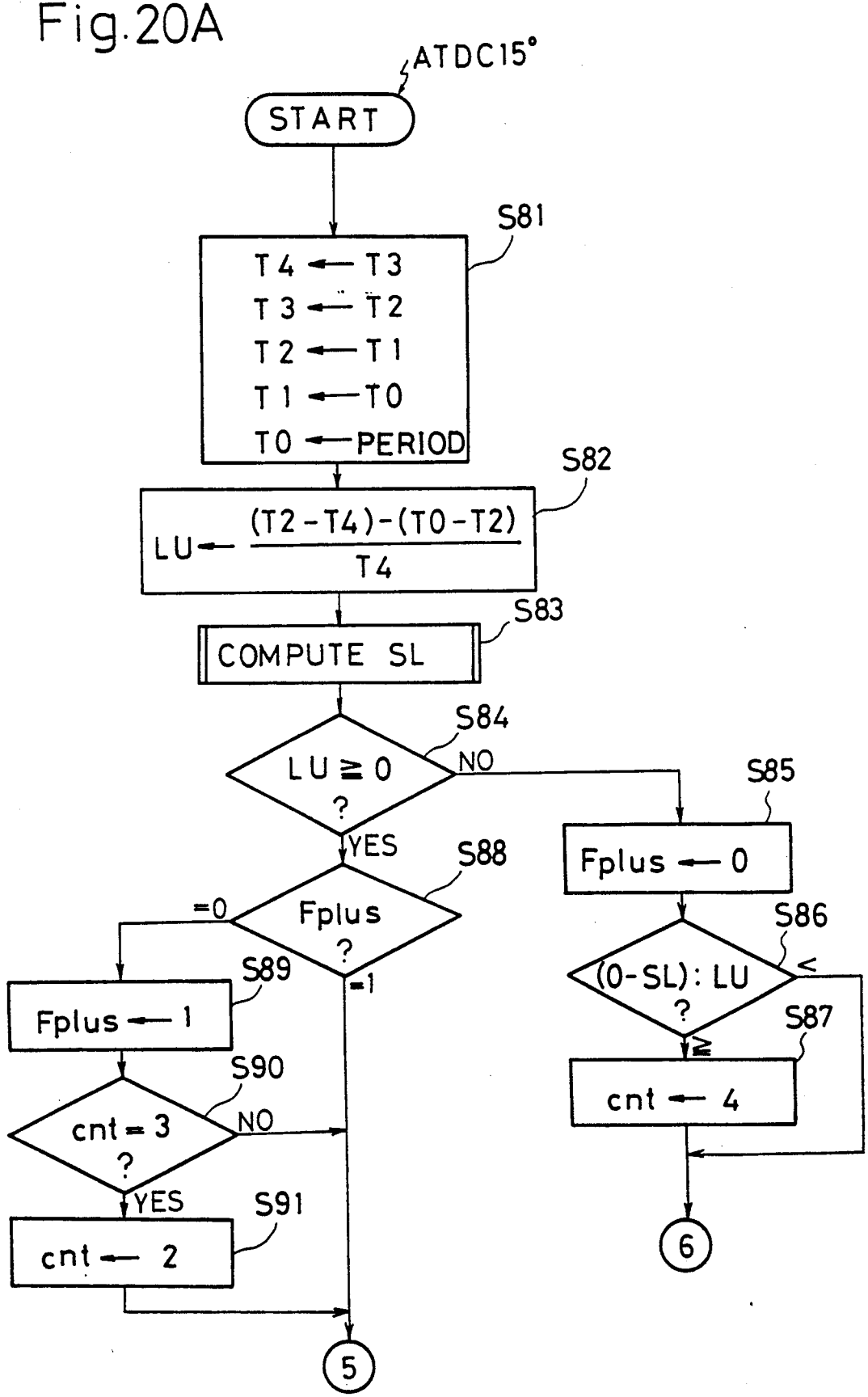
FIGS. 20 and 21 (including parts 20A, 20B, 20C, 21A and 21B) are flow charts illustrating how to control the detection of a misfire cylinder.
Figure 20B:
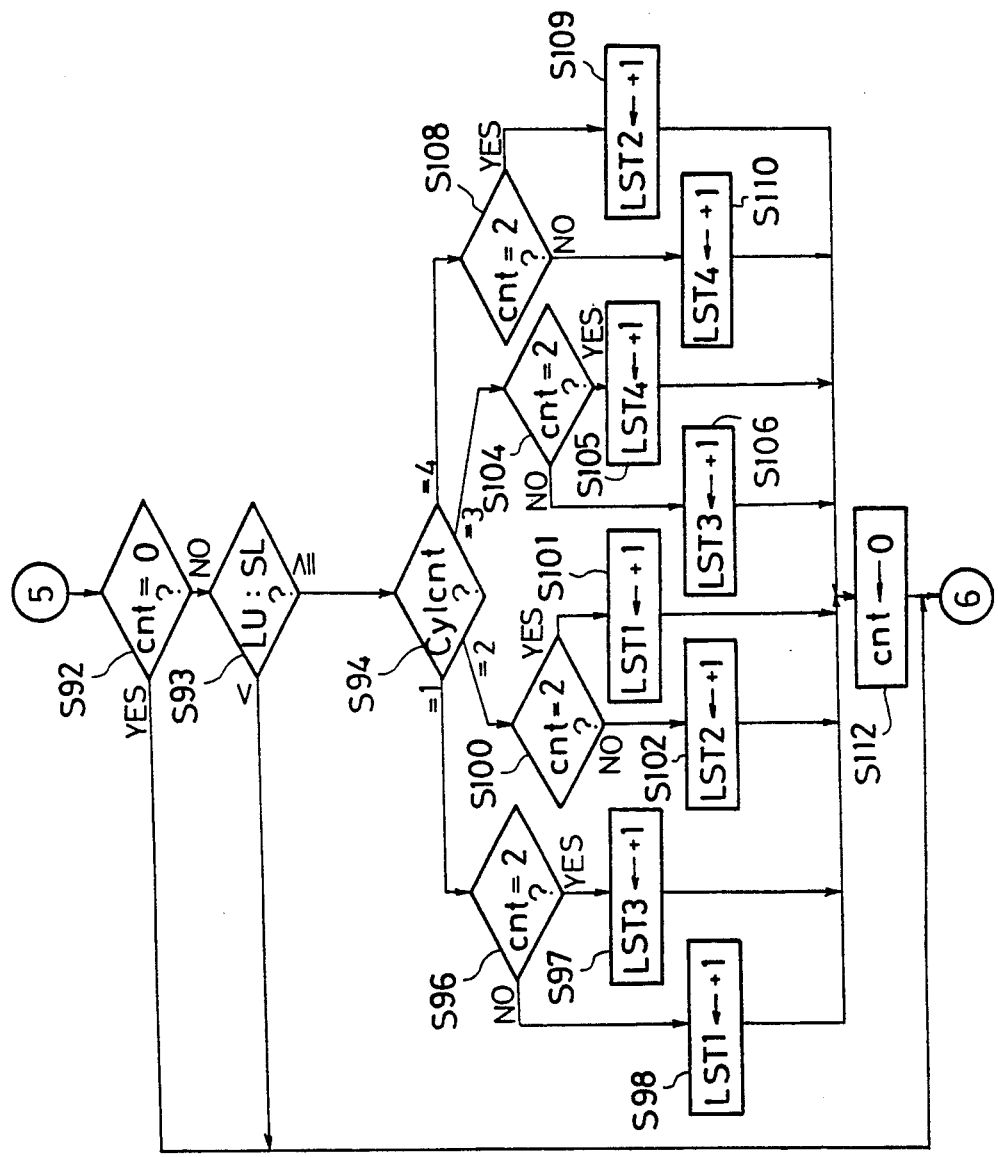
Figure 20C:
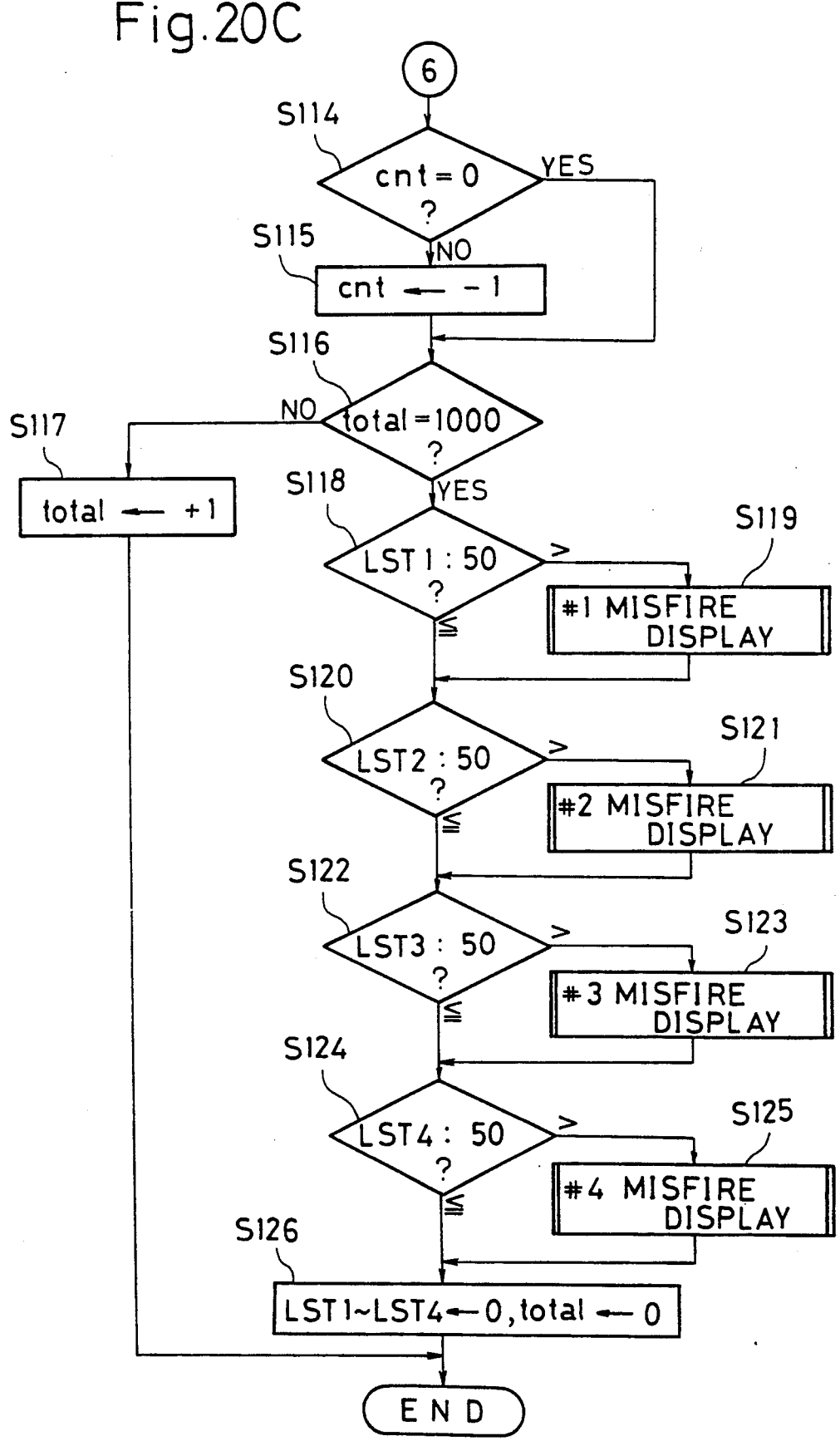
Figure 21B:
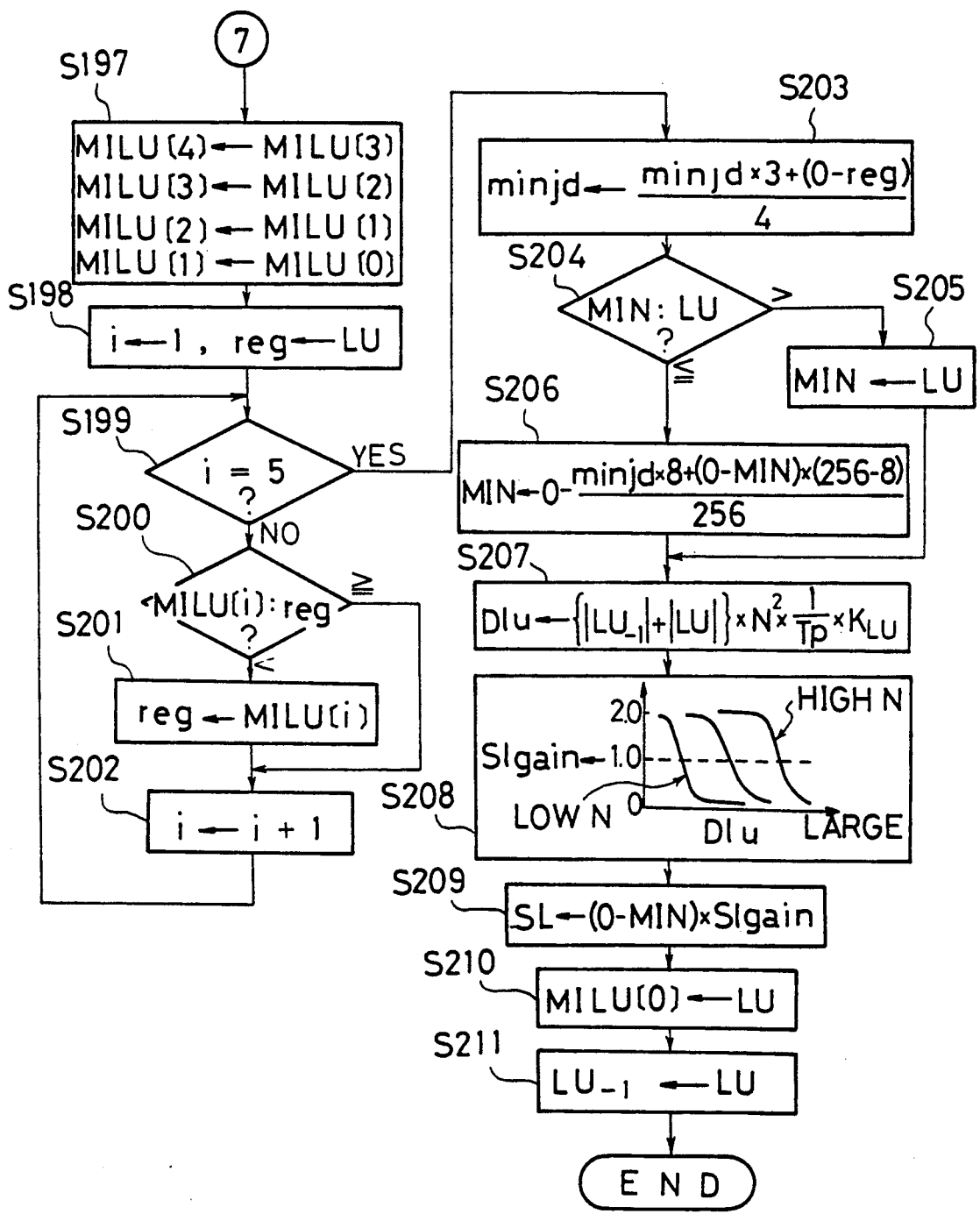

It is to be noted that according to this embodiment, of the components shown in the block diagram of FIG. 19, the functions of the misfired cylinder detecting means, the misfire discriminating value calculating means, the maximum amplitude detecting means, the discriminating value compensating means, the slice level setting means, and the characteristic variable setting means are provided as software in the control unit 29 as illustrated in the flow charts in FIGS. 20 and 21.

Further, the operational condition detecting means in this embodiment corresponds to the airflow meter 26 and the crank angle sensor 30 shown in FIG. 11, while the period measuring means is constituted by the crank angle sensor 30 and the control unit 29.

The flow chart in FIG. 20 is the flow chart in FIG. 12 of the second embodiment except for the content of the process in step 83 which is changed and steps 94, 99, 103, 107, 111 and 113 excluded therefrom. In other words, the control flow corresponding to the third embodiment is the flow chart in FIG. 20 from which step 83 is omitted. According to the fourth embodiment, therefore, the same step numbers are given to those which have the same process contents as the steps in the flow chart in FIG. 12, thus omitting their detailed description.

As the feature of the fourth embodiment which is different from those of the first to third embodiments lies in the process of setting the slice level SL in step 83 in the flow chart in FIG. 20. The control of setting the slice level SL in this step 83 is illustrated in detail in the flow chart in FIG. 21.

In the flow chart in FIG. 21, first it is discriminated in step 181 whether or not the presently calculated misfire discriminating value LU is zero or above; if it is zero or greater, the flow advances to step 182.

In step 182 PLLU[0] to PLLU[3] in which old data of the misfire discriminating values LU which have been discriminated to be equal to or greater than zero are stored in time series, are updated as one item of older data to be PLLU[1]–PLLU[4]. More specifically, the misfire discriminating value LU which has been calculated to be zero or greater most recently excluding this time is set in the PLLU[0], and the discriminating value LU which has been zero or greater before this PLLU[0] is set in the PLLU[1]. As the new discriminating value LU equal to or greater than zero is calculated this time, the previous data is updated as one item of older data in order to set this latest data in the PLLU[0].

In step 183 the old four misfire discriminating values LU updated in the previous step 182 are respectively compared with the presently calculated misfire discriminating value LU, and a "1" is set in a comparison counter i to detect the maximum value from the total of five item of the misfire discriminating value data LU equal to or greater than zero while the presently calculated discriminating value LU is set in a register reg.

In the subsequent step 184 it is discriminated whether or not the value of the counter i reaches "5" that indicates the total comparing number. If the counter value has not reached "5", a PLLU[i] among the PLLU[1] to PLLU[4] which is specified by the counter i is compared with the discriminating value LU set in the reg in step 185. If the PLLU[i] is greater than the reg, the flow advances to step 186 where the discriminating value LU set in the PLLU[i] is renewed.

In the next step 187 the value of the counter i is incremented by "1" so that older data of the PLLU[1] to PLLU[4] will be compared with the reg, then the flow returns to step 184. When the value of the counter i is counted up to "5" from "1" and this value determined to be "5" in step 184, the flow moves to step 188.

In step 188 the reg having the presently-acquired maximum value and the previous maximum weighted average maxjd are added and the resultant value is averaged using the following equation to update the maximum weighted average.

$$\text{maxjd} \leftarrow \frac{\text{maxjd} \times 3 + \text{reg}}{4}$$

In step 189 the previous maximum value MAX is compared with the presently calculated discriminating value LU, and if the value LU is greater than MAX, the flow goes to step 190 where the present discriminating value LU is set to the maximum value MAX (maximum amplitude to the positive side). If the previous maximum value MAX is greater than the present discriminating value LU, on the other hand, the flow advances to step 191 where the maximum weighted average maxjd acquired in the step 188 and the previous maximum value MAX are added and the resultant value is averaged using the following equation, with the result being a new maximum value MAX.

$$\text{MAX} \leftarrow \frac{\text{maxjd} \times 8 + \text{MAX}(256 - 8)}{256}$$

Figure 22:
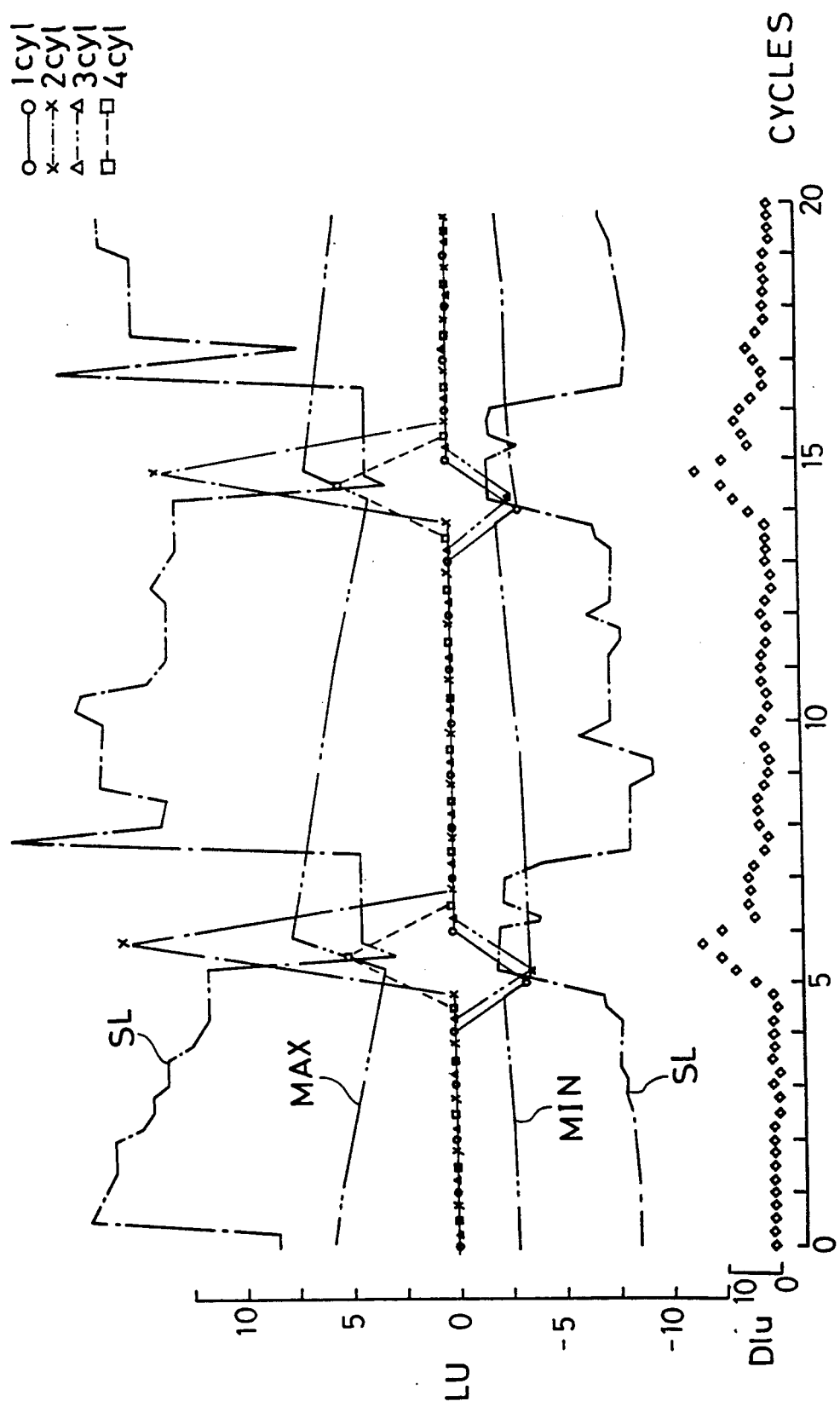
FIG. 22 is a time chart showing whether or not a slice level should be set according to the fourth embodiment.

In other words, when a comparatively large discriminating value LU is computed, its instantaneous value is set in MAX, and when a positive discriminating value LU calculated thereafter does not exceed this MAX, the weighted average maxjd of the largest of the five discriminating values LU most recently calculated and equal to zero or greater and the aforementioned maximum value MAX are added and the resultant value is averaged, thereby gradually decreasing the maximum value MAX (see FIG. 22).

In step 192 the presently calculated discriminating value LU plus the previously calculated discriminating value $LU_{-1}$ is compensated using the following equation based on the engine revolution speed N and the engine load as the operational conditions of the engine, so that this compensation will result in reduction of the level difference between the discriminating values LU which originated from the difference in operational conditions of the engine $$D1u \leftarrow \{|LU_{-1}| + |LU|\} \times N^2 \times 1/Tp \times K_{LU}$$

where Tp is the basic fuel injection amount calculated on the basis of the engine revolution speed N and the sucked air flow rate Q (Tp←K×Q/N; K: constant) and is used here to represent the engine load, the $K_{LU}$ is a constant.

The D1u calculated from the above equation will reduce the operational-conditions-originated level difference between the discriminating values LU, so that the discriminating value LU changes due to only the presence/absence of a misfire and is hardly affected by the operational conditions of the engine such as the engine revolution speed N and the engine load.

Accordingly, if the level of the D1u is discriminated, it is possible to predict the occurrence/nonoccurrence of a misfire irrespective of the operational conditions of the engine, depending on whether D1u is close to zero or has an absolute value equal to or greater than a predetermined value. The result of adding the absolute values of the previous and present discriminating values LU is compensated on the basis of the operational conditions of the engine because of the following reason. As shown in FIG. 23, a four-cylinder engine has two cylinders for which the discriminating values LU are computed to be positive and the remaining two for which the discriminating values LU are calculated to be negative. To clarify the level difference caused by the occurrence/nonoccurrence of a misfire, there is a demand that the occurrence/nonoccurrence of a misfire be predicted with the absolute values further increased. In this respect, the absolute values of two consecutively calculated discriminating values LU are added to clearly increase the level of D1u upon occurrence of a misfire.

In step 193 a function value Slgain for determining the slice level SL based on D1u, which is the discriminating value LU compensated on the basis of the operational conditions of the engine in the step 192, is referred to in a map.

The maximum value MAX is multiplied by this value Slgain as will be described later, with the result taken as the slice level SL. If Slgain is less than "1," the slice level SL is set below the maximum value MAX. If Slgain exceeds "1," on the other hand, the slice level SL is set to exceed the maxim value MAX.

The discrimination of a misfired cylinder is executed when there is a discriminating value LU which exceeds the slice level SL. If the slice level SL is set above the maxim value MAX (outside the maximum amplitude of LU to the positive side), the value LU will not exceed the slice level SL, disabling the misfire discrimination. If the slice level SL is set below the maximum value MAX (within the maximum amplitude of LU to the positive side), the value LU will exceed the slice level SL, permitting the misfire discrimination.

The D1u being large means that the absolute value of the discriminating value LU is large due to the occurrence of a misfire (see FIG. 23). In this case, it is necessary to set the slice level SL smaller than the maximum value MAX to enable the misfire discrimination. In step 193, therefore, at the misfiring time where D1u is equal to or greater than a predetermined value, Slgain is set smaller than "1" as D1u becomes greater than the predetermined value. If D1u is a small value close to zero, which means no misfire has occurred (see FIG. 23), Slgain is set greater than "1" as D1u becomes smaller than the predetermined value.

In other words, with the influence of the operational conditions of the engine eliminated, the occurrence/nonoccurrence of a misfire is discriminated by D1u whose level changes only by the occurrence/nonoccurrence of a misfire, and when D1u is large to indicate a possibility of the occurrence of a misfire, the slice level SL is set below the maximum value MAX which is the maximum amplitude of the discriminating value LU to the positive side, so that the misfire discrimination is done by comparing the discriminating value LU with the slice level SL. When the D1u is small to indicate a possibility of the occurrence of no misfire, the slice level SL is set outside the maximum value MAX, thus inhibiting the misfire discrimination through comparison of the discriminating value LU with the slice level SL.

In setting Slgain based on D1u in the above manner, D1u slightly changes its level due to a change in engine revolution speed N, as shown in FIG. 23. There are multiple D1u-to-Slgain conversion characteristics according to the engine revolution speed N, so that D1u-to-Slgain conversion can be executed according to the associated condition of the engine revolution speed N. This can permit the slice level SL to be set more accurately.

When Slgain is determined as described above, the maximum value MAX (maximum amplitude of the discriminating value LU to the positive side) is multiplied by Slgain, and the result is set in the slice level SL in the next step 194. It should be noted that the slice level SL calculated here is positive and the level of a positive misfire discriminating value LU is discriminated based on this calculated slice level SL as will be described later.

In the subsequent step 195 the presently calculated discriminating value LU is set as the latest positive value in the PLLU[0]. The presently calculated discriminating value LU is also sent in $LU_{-1}$ in the next step 196 so that this value LU can be used as a previous value when this program is executed the next time.

If the discriminate value LU is not discriminated to be zero or greater in step 181, the maximum amplitude to the negative side (minimum value MIN) is detected, the occurrence/nonoccurrence of a misfire is predicted based on D1u acquired by decreasing the level difference of the discriminating value LU based on the operational conditions of the engine, Slgain is set in accordance with the result of the prediction, and the minimum value MIN is multiplied by this Slgain to set the slice level SL (steps 197–211), as in the case of the value LU discriminated as zero or greater.

Even when the discriminating value LU is not zero or above, the occurrence/nonoccurrence of a misfire is predicted based on the level of D1u. When the occurrence of a misfire is expected, the slice level SL is set within the minimum value MIN (maximum negative amplitude) or closer to zero. When the occurrence of a misfire is not expected, the slice level SL is set outside the minimum value MIN (smaller side). In this manner, the level of the negative discriminating value LU can be discriminated on the basis of the slice level SL.

According to the slice level setting of the fourth embodiment, even if the conditions, the engine revolution speed N and the engine load (basic fuel injection amount Tp), change, when the occurrence of a misfire is expected, the slice level SL can be set so that the discriminating value LU exceeds this level SL, whereas when the occurrence of a misfire is not expected, the slice level SL can be set so that the value LU does not exceed the level SL. That is, the slice level SL can be properly set under every operational condition, thereby improving the accuracy of discriminating a misfired cylinder.

With the above-described arrangement which permits the slice level SL to be variably set in accordance with the level of the discriminating value LU, unlike in the map referring system, a large number of matching steps are not required, nor is it necessary to have a large ROM capacity for slice levels SL.

Although the discrimination logic used in the third embodiment is employed in the fourth embodiment, the logic is not limited to this type. Another logic may be used which basically detects the occurrence of a misfire when a discriminating value LU equal to or smaller than the negative slice level SL is calculated. Even in this case, setting the slice level SL in the manner described above can allow for calculation of the proper slice level SL for the operational conditions of the engine based on the discriminating value LU, thus improving the accuracy of detecting a misfired cylinder.

The above-described discrimination logic is used in the fourth embodiment to ensure high detection accuracy even when the rotational fluctuation occurs due to a misfire or in an idling state or the like where the rotation is easily changed.

What is claimed is:

1. A method for detecting a misfired cylinder based on crank angular velocity of an internal combustion engine, comprising the steps of:
   detecting crank angular velocity of said engine;
   detecting a misfired cylinder based on said crank angle velocity;
   detecting a fully-closed state of a throttle valve disposed in an air suction system of said engine; and
   inhibiting detection of said misfired cylinder at least under a condition when said throttle valve disposed in said air suction system of said engine is detected to have said fully-closed state.

2. A method according to claim 1, wherein said detection of said misfired cylinder is inhibited when said throttle valve has said fully-closed state and said crank angular velocity is equal to or greater than a predeterminend level.

3. A method for inhibiting detection of a misfired cylinder of an internal combustion engine by calculating a misfire discriminating valve approximately corresponding to a change in mean effective pressure based on a revolution period of said engine and comparing said misfire discriminating valve with a predetermined slice level of said misfire discriminating valve, said method comprising the steps of:
   acquiring in advance a positive/negative inversion pattern of said misfire discriminating value at a time of occurrence of a misfire and
   inhibiting detection of said misfired cylinder when an actual misfire discriminating value does not change according to said positive/negative inversion pattern.

4. A method according to claim 3, wherein said detection of said misfired cylinder is inhibited by decreasing an absolute value of said misfire discriminating value for compensation.

5. A method according to claim 3, wherein a number of actual misfire discriminating values which are to be compared with said positive/negative inversion pattern acquired in advance is variably set in accordance with engine operation conditions.

6. A method for detecting a misfired cylinder of an internal combustion engine having an even number of cylinders, comprising the steps of:
   computing a misfire discriminating value approximately corresponding to an amount of a change in mean effective pressure based on a revolution period of said engine while setting a slice level of said misfire discriminating value for detection of said misfired cylinder according to said misfire discriminating value; and
   detecting a cylinder corresponding to a misfire discriminating value of one engine turn before from a first inversion of said misfire discriminating value from negative to positive, when misfire discriminating values corresponding to half of said cylinders in a consecutive ignition order are negative, misfire discriminating values corresponding to a remaining second half of said cylinders are positive, at least one of said misfire discriminating values which are negative equal to or less than a negative slice level of said misfire discriminating value, and at least one of said misfire discriminating values which are positive exceeds a positive slice level of said misfire discriminating value.

7. A method for detecting a misfired cylinder of an internal combustion engine, comprising the steps of:
calculating a misfire discriminating value approximately corresponding to an amount of a change in mean effective pressure based on a period within a predetermined crank angle range of said engine;
detecting a maximum amplitude of said misfire discriminating value while compensating said misfire discriminating value in a direction to reduce a level difference between misfire discriminating value originating from an engine operational condition based on operational conditions of said engine including at least revolution speed of said engine and engine load of said engine;
setting a slice level of said misfire discriminating value within said maximum amplitude when an amplitude of a compensated misfire discriminating value is equal to or greater than a predetermined value, and setting said slice level outside said maximum amplitude when said amplitude of said compensated misfire discriminating value is lless than said predetermined value; and
comparing said slice level as set with said misfire discriminating value to thereby detect said misfired cylinder.

8. A method according to claim 7, wherein compensation for a misfire disciminating value in said direction to reduce said level difference between said misfire discriminating values originating from said engine operational condition is executed by multiplying said misfire discriminating value by a parameter of said engine revolution speed, then dividing a resultant value by a parameter of said engine load.

9. A method according to claim 7, wherein a characteristic for setting said slice level is variably set in accordance with said engine revolution speed.

10. An apparatus for detecting a misfired cylinder of an internal combustion engine, comprising:
angular velocity detecting means for detecting a crank angular velocity of said engine;
misfired cylinder detecting means for detecting said misfired cylinder based on said crank angular velocity;
fully-closed state detecting means for detecting a fully-closed state of a throttle valve disposed in an air suction system of said engine; and
misfire detection inhibiting means for inhibiting said misfired cylinder detecting means from detecting said misfired cylinder at least under a condition when said fully-closed state of said throttle value has been detected.

11. An apparatus according to claim 10, wherein said misfire detection inhibiting means inhibits detection of said misfired cylinder when said fully-closed state of said throttle valve is detected and said crank angular velocity is equal to or greater than a predetermined level.

12. An apparatus for inhibiting detection of a misfired cylinder of an internal combustion engine, comprising:
period measuring means for measuring a revolution period of said engine;
misfire discriminating value calculating means for calculating a misfire discriminating value approximately corresponding to an amount of a change in mean effective pressure based on said revolution period;
misfired cylinder detecting means for detecting a misfired cylinder by comparing said calculated misfire discriminating value with a predetermined slice level of said misfire discriminating value; and
misfire detection inhibiting means for inhibiting said misfired cylinder detecting means from detecting said misfired cylinder when an actual misfire discriminating value does not change along a preacquired positive/negative inversion pattern of said misfire discriminating value at a time of occurrence of a misfire.

13. An apparatus according to claim 12, wherein said misfire detection inhibiting means inhibits said misfired cylinder detecting means from detecting said misfired cylinder by decreasing an absolute value of said misfire discriminating value for compensation.

14. An apparatus according to claim 12, further comprising a discriminating number variable setting means for variably setting a number of chances for discriminating misfire discriminating values whose positive/negative inversion pattern is discriminated by said misfire detection inhibiting means, in accordance with operational conditions of said engine.

15. An apparatus for detecting a misfired cylinder of an internal combustion engine comprising:
period measuring means for measuring a revolution period of said internal combustion engine having an even number of cylinders;
misfire discriminating value calculating means for calculating a misfire discriminating value approximately corresponding to an amount of a change in mean effective pressure based on said revolution period;
operational condition detecting means for detecting an engine operational condition;
slice level setting means for setting a slice level of said misfire discriminating value for detection of a misfired cylinder by said misfire discriminating value based on said engine operational condition; and
misfired cylinder detecting means for detecting a cylinder corresponding to a misfire discriminating value of one engine turn before from a first inversion of a misfire discriminating values from negative to positive, when misfire discriminating values corresponding to half of said cylinders in a consecutive ignition order are negative, misfire discriminating values corresponding to a remaining second half of said cylinders are positive, at least one of said consecutive negative misfire discriminating values is equal to or less than a negative value of said slice level, and at least one of said consecutive positive misfire discriminating values exceeds a postive value of said slice level.

16. An apparatus for detecting a misfired cylinder of an internal combustion engine, comprising:
period measuring means for measuring a period within a predetermined crank angle range of said engine;
misfire discriminating value calculating means for calculating a misfire discriminating value approximately corresponding to an amount of a change in mean effective pressure based on said measured period;

maximum amplitude detecting means for detecting a maximum amplitude of said misfire discriminating value;

operational condition detecting means for detecting operational conditions of said engine including at least revolution speed of said engine and an engine load of said engine;

discriminating value compensating means for compensating said misfire discriminating value in a direction to reduce a level difference between misfire discriminating values originating from an engine operational condition based on said detected operational conditions of said engine;

slice level setting means for setting a slice level of said misfire discriminating value within said maximum amplitude detected by said maximum amplitude detecting means when an amplitude of said compensated detecting means when an amplitude of said compensated misfire discriminating value is equal to or greater than a predetermined value, and setting said slice level outside said maximum amplitude when said amplitude of said compensated misfire discriminating value is less than said predetermined value; and misfired cylinder detecting means for comparing said set slice level with said misfire discriminating value calculated by said misfire discriminating value calculating means to thereby detect a misfired cylinder.

17. An apparatus according to claim 16, wherein said discriminating value compensating means compensates a misfire discriminating value in said direction to reduce said level difference between misfire discriminating values originating from an engine operational condition by multiplying said misfire discriminating value, calculated by said misfire discriminating value calculating means, by a parameter of said engine revolution speed, then dividing a resultant value by a parameter of said engine load.

18. An apparatus according to claim 16, further comprising characteristic varying means for variably setting a slice level setting characteristic in said slice level setting means in accordance with said engine revolution speed.

* * * * *